United States Patent
Saeugling

(10) Patent No.: US 11,847,806 B2
(45) Date of Patent: Dec. 19, 2023

(54) INFORMATION EXTRACTION FROM IMAGES USING NEURAL NETWORK TECHNIQUES AND ANCHOR WORDS

(71) Applicant: Dell Products, L.P., Round Rock, MA (US)

(72) Inventor: Lee Daniel Saeugling, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 277 days.

(21) Appl. No.: 17/153,359

(22) Filed: Jan. 20, 2021

(65) Prior Publication Data

US 2022/0230020 A1    Jul. 21, 2022

(51) Int. Cl.

| | |
|---|---|
| G06K 9/20 | (2006.01) |
| G06K 9/32 | (2006.01) |
| G06K 9/62 | (2022.01) |
| G06N 3/08 | (2023.01) |
| G06V 10/22 | (2022.01) |

(Continued)

(52) U.S. Cl.
CPC ............ G06V 10/23 (2022.01); G06F 18/214 (2023.01); G06F 18/2163 (2023.01); G06N 3/08 (2013.01); G06V 10/242 (2022.01); G06V 10/25 (2022.01); *G06F 40/166* (2020.01); *G06V 30/10* (2022.01)

(58) Field of Classification Search
CPC .. G06F 40/166; G06K 9/6256; G06K 9/6261; G06K 9/627; G06N 3/08; G06V 10/23; G06V 10/242; G06V 10/243; G06V 10/247; G06V 10/25; G06V 10/267; G06V 30/10; G06V 30/414
See application file for complete search history.

(56) References Cited

U.S. PATENT DOCUMENTS

| | | |
|---|---|---|
| 4,945,502 A | 7/1990 | Kwon et al. |
| 5,526,446 A | 6/1996 | Adelson et al. |

(Continued)

OTHER PUBLICATIONS

International Search Report and Written Opinion received for PCT Application Serial No. PCT/US2021/028996 dated Oct. 13, 2021, 15 pages.

(Continued)

*Primary Examiner* — Michael J Vanchy, Jr.
(74) *Attorney, Agent, or Firm* — Amin, Turocy & Watson, LLP

(57) ABSTRACT

Scene text information extraction of desired text information from an image can be performed and managed. An information management component (IMC) can determine an anchor word based on analysis of an image. To facilitate determining desired text information in the image, IMC can re-orient the image to zero or substantially zero degrees if it determines that the orientation is skewed. IMC can utilize a neural network to determine and apply bounding boxes to text strings in the image. Using a rules-based approach or machine learning techniques, employing a trained machine learning component, IMC can utilize the anchor word along with inline grouping of textual information in the image, deep text recognition analysis, or bounding box prediction to determine or predict the desired text information in the image. IMC can facilitate presenting the desired text information, anchor word, or other information obtained from the image in an editable format.

20 Claims, 11 Drawing Sheets

(51) Int. Cl.

| | |
|---|---|
| *G06V 10/25* | (2022.01) |
| *G06V 10/24* | (2022.01) |
| *G06F 18/214* | (2023.01) |
| *G06F 18/21* | (2023.01) |
| *G06F 40/166* | (2020.01) |
| *G06V 30/10* | (2022.01) |

(56) References Cited

U.S. PATENT DOCUMENTS

| | | | |
|---|---|---|---|
| 5,559,902 | A | 9/1996 | Bose et al. |
| 5,563,963 | A | 10/1996 | Kaplan et al. |
| 5,594,815 | A | 1/1997 | Fast et al. |
| 6,028,957 | A | 2/2000 | Katori et al. |
| 6,195,467 | B1 | 2/2001 | Asimopoulos et al. |
| 6,731,823 | B1 | 5/2004 | Gallagher et al. |
| 6,990,252 | B2 | 1/2006 | Shekter |
| 7,119,837 | B2 | 10/2006 | Soupliotis et al. |
| 7,599,572 | B2 | 10/2009 | Shekter |
| 8,229,245 | B2 | 7/2012 | Mallat et al. |
| 8,300,979 | B2 | 10/2012 | Ordentlich et al. |
| 8,880,540 | B1 * | 11/2014 | Sampson ............. G06V 30/418 707/758 |
| 2017/0372439 | A1 * | 12/2017 | Smith ................... G06V 10/95 |
| 2021/0073514 | A1 * | 3/2021 | Sangala ............... G06V 40/376 |
| 2021/0397986 | A1 * | 12/2021 | Aggarwal ............. G06V 10/82 |

OTHER PUBLICATIONS

Lohani et al., "An Invoice Reading System Using a Graph Convolutional Network", Advances in Databases and Information Systems [Lecture Notes in Computer Science; Lect. Notes Computer], Springer International Publishing, Cham, XP047510931, Jun. 19, 2019, pp. 144-158.

Reisswig et al., "Chargrid-OCR: End-to-end trainable Optical Character Recognition through Semantic Segmentation and Object Detection", arxiv.org, Cornell University Library, 201 Olin Library Cornell University Ithaca, NY 14853, XP081476104, Sep. 10, 2019, 4 pages.

Zacharias et al., "Image Processing Based Scene-Text Detection and Recognition with Tesseract", arxiv.org, Cornell University Library, 201 Olin Library Cornell University Ithaca, NY 14853, XP081646737, Apr. 17, 2020, 6 pages.

Baek et al., "Character Region Awareness for Text Detection," arXiv:1904.01941v1 [cs.CV] Apr. 3, 2019, 12 pages.

Baek et al., "What is Wrong With Scene Text Recognition Model Comparisons? Dataset and Model Analysis," arXiv: 1904.01906v4 [cs.CV] Dec. 18, 2019, 19 pages.

"Abbyy," https://www.abbyy.com/, 13 pages.

"Edgeverve," https://www.edgeverve.com/artificial-intelligence/nia/, 12 pages.

Thakur, "Text Detection and Character Recognition in Images with Neural Networks," Master's Thesis, Thapar Institute of Engineering & Technology, Jul. 2018, 105 pages.

Paygude et al., "Image Processing Using Machine Learning," Sep. 2020 IJSDR | vol. 5, Issue 9, 7 pages.

Yadav et al., "Handwritten Hindi character recognition: a review," IET Image Processing, vol. 12, Issue11, Nov. 2018, 15 pages.

Samuel et al., "Automatic Text Segmentation and Recognition in Natural Scene Images Using Msocr," Current Signal Transduction Therapy, vol. 15 , Issue 3 , 2020, 12 pages.

Safonov et al., "Document Image Processing for Scanning and Printing," Signals and Communication Technology, 2019, 314 pages.

Sarmah et al., "Optimization Models in Steganography Using Metaheuristics," Springer International Publishing, 2020, 174 pages.

Du et al., "Perceptual hashing for image authentication: A survey," Signal Processing: Image Communication vol. 81, Feb. 2020, 115713, 66 pages.

Aradhya et al., "Decade research on text detection in images/videos: a review," Evolutionary Intelligence, Jun. 2019, 27 pages.

Dekhtiar et al., "Deep learning for big data applications in CAD and PLM—Research review, opportunities and case study," Sep. 2018, Computers in Industry, 100, 18 pages.

\* cited by examiner

INFORMATION EXTRACTION FROM IMAGES USING NEURAL NETWORK TECHNIQUES AND ANCHOR WORDS

TECHNICAL FIELD

This disclosure relates generally to processing data, e.g., information extraction from images using neural network techniques and anchor words.

BACKGROUND

Entities, such as business entities, typically can receive visual images in the form of photographs, scanned documents, uneditable electronic documents, or other types of visual images from other entities, such as customers, vendors, other business entities, or governmental entities with which an entity is doing or has done business or with which the entity is otherwise associated. Often these visual images can be in a form that can render the information contained in the visual images (e.g., visual images of electronic or scanned documents, or visual image of a product label) non-searchable or difficult to desirably (e.g., accurately and efficiently) extract or determine using traditional automated processes and equipment.

The above-described description is merely intended to provide a contextual overview regarding processing of images and documents, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise determining, by a system comprising a processor, an anchor word in a visual image based at least in part on analyzing the visual image and a group of anchor words, wherein the group of anchor words comprises the anchor word. The method also can comprise determining, by the system, a first location of a text string within the visual image based at least in part on a second location determined for the anchor word, wherein the text string is determined to be associated with the anchor word based at least in part on a proximity of the first location to the second location. The method further can comprise determining, by the system, characters of the text string based at least in part on the anchor word and features of the text string extracted from a bounding box associated with the text string.

In certain embodiments, the disclosed subject matter can comprise a system that can include a memory that stores computer executable components, and a processor that executes computer executable components stored in the memory. The computer executable components can comprise an information management component that can determine a context item of information in an image based at least in part on analyzing the image and a group of context items of information, determine a first location of an item of text information within the image based at least in part on a second location determined for the context item of information, and determine that the item of text information is a target item of text information and characters of the item of text information based at least in part on the context item of information and features of the item of text information extracted from a bounding box associated with the item of text information, wherein the group of context items of information can comprise the context item of information. The item of text information can be determined to be associated with the context item of information based at least in part on a relative locational relationship between the first location and the second location. The computer executable components also can include an interface component that can present at least one of the context item of information or the item of text information.

In still other embodiments, a non-transitory machine-readable medium, comprising executable instructions that, when executed by a processor, facilitate performance of operations. The operations can comprise determining a context item in a visual image based at least in part on analyzing the visual image and a set of context items, wherein the set of context items comprises the context item. The operations also can comprise determining a first location of an item of text information within the visual image based at least in part on a second location determined for the context item, wherein the item of text information is determined to be associated with the context item based at least in part on a proximity of the first location to the second location. The operations further can comprise determining that the item of text information is a target item of text information and characters of the item of text information based at least in part on the context item and features of the item of text information extracted from a bounding box associated with the item of text information.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
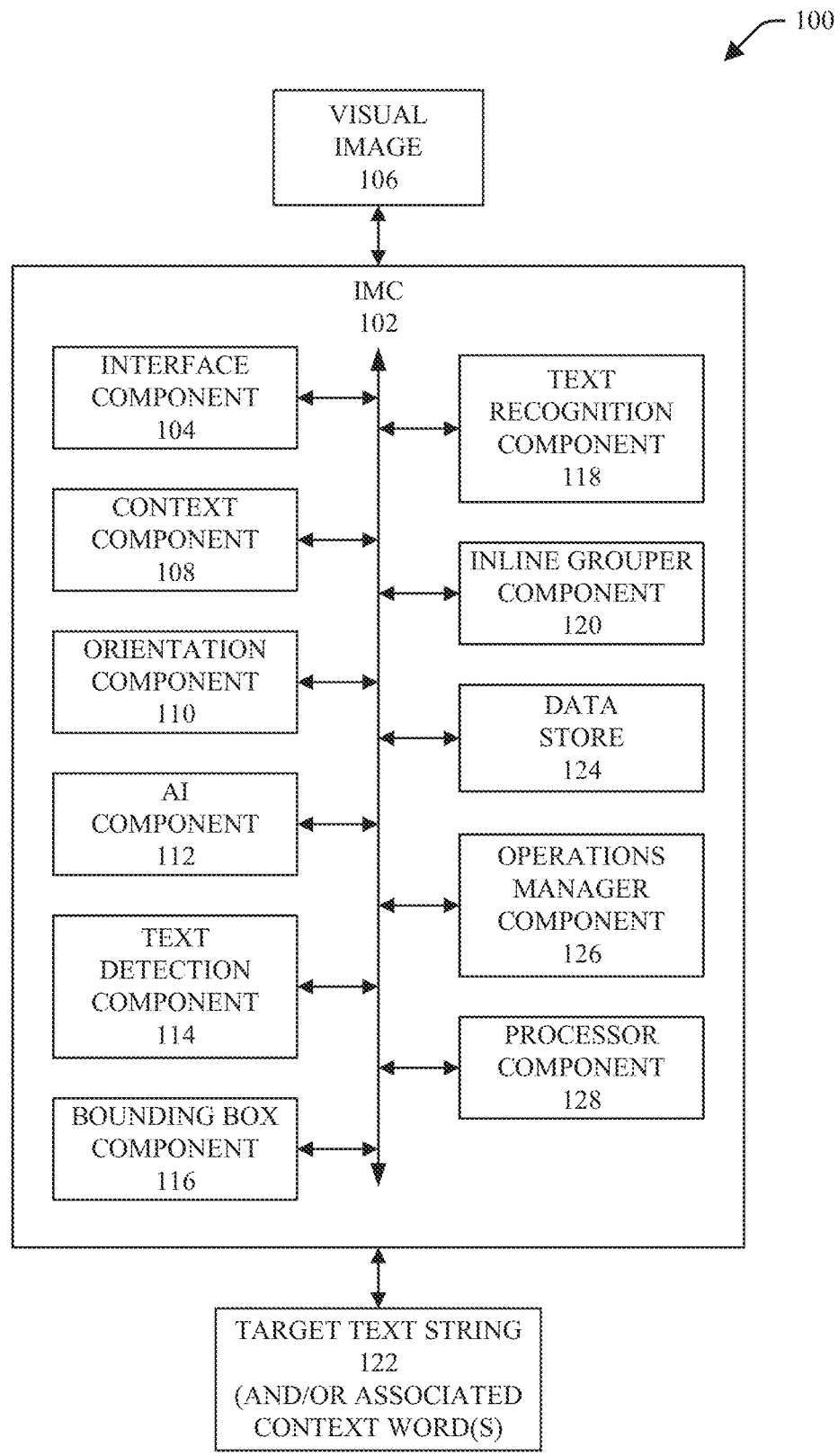
FIG. 1 illustrates a block diagram of an example system that can determine a desired (e.g., target) text string and associated context word (e.g., anchor word or anchor text string) in a visual image, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Entities, such as business entities, typically can receive visual images in the form of photographs, scanned documents, uneditable electronic documents, or other types of visual images from other entities, such as customers, vendors, other business entities, or governmental entities with which an entity is doing or has done business or with which the entity is otherwise associated. For instance, a business entity may interface with its customers through a variety of channels. In many cases, in connection with a request, the customer may send a visual image (e.g., photograph or scanned document, such as a request form or receipt) to the business entity to try to better communicate the customer's request or because the business entity has requested certain information from the customer. As another example, a business entity can have or receive physical hard copies of invoices, receipts, purchase orders, order forms, business forms, or other types of documents associated with vendors or other business or governmental entities, or can have visual images (e.g., scanned copies) of those documents.

Often these visual images can be in an undesirable form that can render the information contained in the visual images (e.g., visual images of electronic or scanned documents, or visual image of a product label) non-searchable or difficult to desirably (e.g., accurately, efficiently, and feasibly) extract or determine using traditional automated processes and equipment. For instance, visual images received from customers or vendors often can contain blurring, reflections, noise and/or other distortions that can make it difficult extract or determine desired information in those visual images using traditional automated processes and equipment. As a result, a business entity usually can have a person manually review a visual image to try to obtain the desired (e.g., relevant) information from the visual image. However, this manual process can be difficult, time consuming, and costly to the business entity, particularly when there are a significant number of visual images involved. This manual process also can create undesirable delays for the customer or other entity, and can result in a negative customer experience. Also, there can be an undesirable number of instances where a person, who is engaging in the manual process of identifying information in visual images, makes mistakes when transposing the information in the visual image into the person's workflow, which also can lead to negative customer experience and potentially financial consequences for the business entity.

A traditional technology employed for identifying information in and extracting information from images is optical character recognition (OCR). However, OCR technology typically is not able to desirably (e.g., suitably, accurately, and efficiently) and automatically find and identify a desired piece of information in an image of a text document. OCR technology generally works on specific non-varying pre-defined templates. Further, OCR technology typically does not work well to find and identify desired information in low quality images. A primary functionality of OCR technology is to extract information from a pre-defined template on a high quality portable document format (PDF)-like image. OCR technology can have an undesirably low tolerance for any significant type of variance in the location of a desired text string or image quality.

There are certain other conventional technologies that purport to work in identifying information in images (e.g., images of documents) of documents using certain different templates, such as purchase orders, from different companies. However, these certain conventional technologies typically are limited to only working in a suitable and accurate manner to identify information in and extract information from high quality images, such as high quality PDF documents, and typically can be limited to a relatively small number of different or varied types of document templates.

To that end, techniques for desirably (e.g., suitably, accurately, reliably, and efficiently) performing and managing scene text information extraction of desired text information from a visual image are presented. The disclosed subject matter can comprise an information management component (IMC) that can perform and manage operations relating to scene text information extraction of desired (e.g., relevant or pertinent) text information from visual images. The IMC can identify or determine an anchor word in a visual image based at least in part on the results of an analysis of the image. To facilitate determining desired text information (e.g., an alphanumeric text string) in the image, the IMC can analyze the orientation of the image, and, if the IMC determines that the orientation is skewed based on such orientation analysis, the IMC can re-orient the image to be aligned at zero or substantially zero degrees (e.g., the orientation of the anchor word and/or potential text information can be aligned at zero or substantially zero degrees).

In some embodiments, the IMC can utilize a neural network to detect or determine text information in the image, and can apply bounding boxes to candidate text information (e.g., candidate or potential text strings) detected in the image. For example, the IMC can employ a character region awareness for text detection (CRAFT) analysis, which can localize individual words, numbers, or other potential text strings in bounding boxes, wherein such individual words, numbers, or other potential text strings in bounding boxes can be respective items of candidate text information. The IMC can output respective (e.g., individual) images of the respective items of candidate text information (e.g., respective images of the information in the respective bounding boxes) for further analysis.

In accordance with various embodiments, the IMC can employ a rules-based techniques and/or machine learning techniques, using a trained machine learning component, to facilitate determining or predicting the desired text information (e.g., desired item of text information) from the visual image based at least in part on the results of an analysis (e.g., rules-based analysis and/or machine learning analysis) of the respective images of the respective items of candidate text information. For instance, employing the rules-based techniques and/or machine learning techniques, the IMC can utilize the anchor word along with inline grouping of textual information in the image (e.g., inline bounding boxes associated with respective items of candidate text information in the respective images), deep text recognition (DTR) analysis (e.g., generalized or specialized DTR analysis), and/or bounding box prediction to determine or predict the desired text information in the visual image. The IMC can facilitate presenting the desired text information (e.g., the final, best, or highest scoring determination or prediction of the text information), anchor word, or other information identified in and extracted from the image, for example, in an editable format.

These and other aspects and embodiments of the disclosed subject matter will now be described with respect to the drawings.

Referring now to the drawings, FIG. 1 illustrates a block diagram of an example system 100 that can determine (e.g., automatically determine) a desired (e.g., target) text string and associated context word (e.g., anchor word or anchor text string) in a visual image, in accordance with various aspects and embodiments of the disclosed subject matter. The system 100 can comprise an information management component (IMC) 102 that can perform and manage operations relating to scene text information extraction of desired (e.g., relevant or pertinent) information, such as text information (e.g., alphabetical, numerical, or alphanumeric text strings), from visual images.

The IMC 102 can comprise an interface component 104 that can include desired interfaces to facilitate receiving information and communicating information. The interface component 104 can comprise, for example, a display screen (e.g., a non-touch sensitive display screen, or a touch display screen), an audio interface (e.g., microphone(s), speakers, or other desired audio interface), a haptic interface, a keyboard, a mouse, a track pad, an input interface, an output interface, a communication network interface, and/or another desired interface. The IMC 102 can receive information, such as visual images (e.g., visual image 106), via a desired interface (e.g., input interface, network interface, or other desired interface) of the interface component 104. The visual images (e.g., visual image 106) can be or can comprise, for example, photographs, scanned or captured documents, electronic documents (e.g., portable document format (PDF) documents), or other type of visual or electronic image or document. For example, a visual image can be a photograph of product label on the back of an electronic device, wherein the product label can contain product-related information (e.g., manufacturer name, model number, serial number, or other product-related information). As another example, a visual image can be a photograph, or a scanned or captured document, of a purchase order, an invoice, an accounts payable document, an accounts receivable document, a receipt, or other type of document (e.g., other type of business-related, purchase-related, or product-related document). A visual image (e.g., visual image 106) typically can be an image that does not contain editable or individually selectable text information or characters.

The IMC 102 also can comprise a context component 108 that can determine or identify context or anchor words or text strings in visual images, such as visual image 106. The context component 108 can comprise a set of context words that can be relevant or related to text information (e.g., a text string) of interest in a visual image (e.g., visual image 106). While, for reasons of brevity and ease of description, the phrases context word, set of context words, and the like, often will be used herein, the disclosed subject matter, when referencing or describing the phrases context word, set of context words, and the like, can be referring to context or anchor words, context or anchor text strings, content or anchor characters, context or anchor symbols, context or anchor items, context or anchor information, or other variants thereof. The set of context words can comprise, for example, context words indicating, referencing, or relating to serial number (e.g., serial number, serial no., serial #, S/N, service tag, or other word, phrase, text string, or symbol that can indicate, reference, or relate to serial number); manufacturer (e.g., manufacturer name, manufacturer symbol, manufacturer trademark, service mark, or design mark, or other word, phrase, text string, or symbol that can indicate, reference, or relate to a manufacturer); model number (e.g., model number, model no., model #, or other word, phrase, text string, or symbol that can indicate, reference, or relate to a model number) of a product; order identifier (e.g., order number, text string, or other order identifier); purchase order identifier (e.g., purchase order number, text string, or other purchase order identifier); invoice identifier (e.g., invoice number, text string, or other invoice identifier); name (e.g., name, first name, middle name or initial, last name, business or organization name, or other word, phrase, text string, or symbol that can indicate, reference, or relate to a type of name); address (e.g., address, street address, residential address, business address, floor number, suite number, building name, P.O. Box, city, state, postal code, zip code, country, country code, or other word, phrase, text string, or symbol that can indicate, reference, or relate to a type of or part of an address); a service code (e.g., service code, express service code, or other word, phrase, text string, or symbol that can indicate, reference, or relate to a type of a service code) associated with a product or service; account identifier (e.g., account number, account no., account #, or other word, phrase, text string, or symbol that can indicate, reference, or relate to an account identifier); email (e.g., email, email address, or other word, phrase, text string, or symbol that can indicate, reference, or relate to an email address); phone number (e.g., phone number, phone no., phone #, or other word, phrase, text string, or symbol that can indicate, reference, or relate to a phone number); website address or identifier (e.g., website, website address, web, web address, domain, or other word, phrase, text string, or symbol that can indicate, reference, or relate to a website address); another desired type of context word; and/or variants (e.g., plural versions, abbreviations, synonyms, or other variants) of any of the context words. It is to be appreciated and understood that the example context words described above and herein are merely exemplary, and the set of context words can comprise virtually any type of word, phrase, text string, or symbol that can indicate, reference, or relate to information that can be of interest to a user or entity.

In some embodiments, the context component 108 can analyze (e.g., automatically analyze) a visual image, such as visual image 106, to determine or identify (e.g., automatically determine or identify) whether any context words appear in the visual image based at least in part on the set of context words. For instance, the context component 108 can analyze visual image 106 and the set of context words, wherein the visual image 106 can contain one or more items that can be one or more context words. Based at least in part on the analysis results, the context component 108 can identify or recognize (e.g., automatically identify or recognize) one or more items (e.g., one or more words, text strings, characters, symbols, or other items) in the visual image 106 that satisfy defined match criteria with regard to one or more context words of the set of context words (e.g., identify or recognize one of more items in the visual image 106 that match or substantially match one or more context words of the set of context words, in accordance with the defined match criteria).

Figure 2:
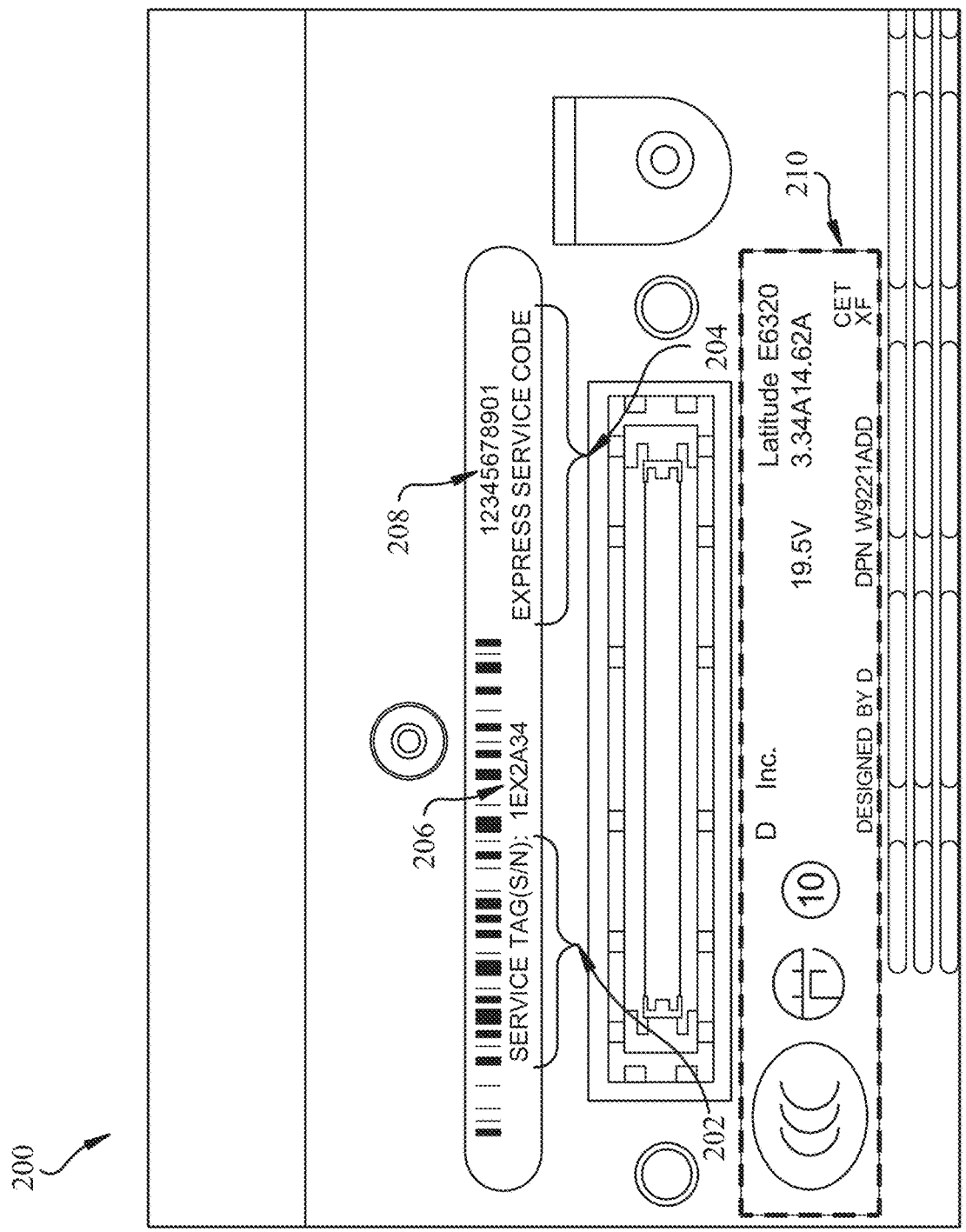
FIG. 2 depicts a diagram of an example visual image that can comprise context words and associated text strings, in accordance with various aspects and embodiments of the disclosed subject matter.

Referring briefly to FIG. 2 (along with FIG. 1), FIG. 2 depicts a diagram of an example visual image 200 that can comprise context words and associated text strings, in accordance with various aspects and embodiments of the disclosed subject matter. The visual image 200 can comprise context words, including SERVICE TAG 202 (as well as context word: S/N) and EXPRESS SERVICE CODE 204, and respectively associated text strings, including 1EX2A34 (206) and 12345678901 (208), in respective regions of the visual image 200. The context component 108 can analyze the visual image 200 to determine or identify whether any context words appear in the visual image 200 based at least in part on the set of context words, wherein the set of context words can comprise service tag (as well as S/N) and express service code. Based at least in part on the analysis results, the context component 108 can identify or recognize (e.g., automatically identify or recognize) SERVICE TAG 202 (and/or S/N) and EXPRESS SERVICE CODE 204 in the visual image 200 and can determined that they each satisfy defined match criteria with regard to corresponding context words (e.g., service tag (and/or S/N) and express service code) of the set of context words, as SERVICE TAG 202 (and/or S/N) and EXPRESS SERVICE CODE 204 in the visual image 200 can match or at least substantially match the corresponding context words of the set of context words, in accordance with the defined match criteria. The IMC 102 also can identify or determine the text strings (e.g., 1EX2A34 (206) and 12345678901 (208)) respectively associated with the context words SERVICE TAG 202 and EXPRESS SERVICE CODE 204, using the various disclosed techniques relating to scene text information extraction, as more fully described herein. As depicted in FIG. 2, there also can be other context words and text strings (e.g., context words, such as DESIGNED BY, MADE IN, and DPN, and respectively associated text strings, such as DELL, China, and W922J A00, in region 210) in the visual image 200 that can be identified or determined by the IMC 102 using the various disclosed techniques relating to scene text information extraction; however, for reasons of brevity and clarity, those other context words and text strings will not be further discussed herein.

Sometimes a visual image can be skewed (e.g., skewed at an angle other than zero degrees) such that identifying or extracting text strings (e.g., characters of text strings) can be problematic and/or prone to error. In some embodiments, after identifying one or more context words in a visual image (e.g., visual image 106 or visual image 200), the IMC 102 can employ an orientation component 110 to analyze and/or adjust (e.g., automatically analyze or adjust) the orientation of the visual image prior to analyzing the visual image to determine, identify, and/or extract desired text information in or from the visual image. To facilitate determining desired text information (e.g., an alphanumeric text string) in the visual image, the orientation component 110 can analyze the orientation of the visual image, and, if the orientation component 110 determines that the orientation is skewed based at least in part on the results of such orientation analysis, the orientation component 110 can re-orient the visual image to be aligned at zero or substantially zero degrees (e.g., the orientation of the anchor word and/or potential text information can be aligned at zero or substantially zero degrees).

Usually, the IMC 102 can have the ability to determine or identify a context word(s) in a visual image, even if the visual image is skewed. However, there potentially can be instances where the IMC 102 is not able to determine or identify a context word(s) in a visual image if the visual image is skewed, and/or it may be otherwise desirable to de-skew a skewed visual image prior to analyzing the visual image to determine or identify a context word(s) in the visual image. Accordingly, in other embodiments, the IMC 102 can employ the orientation component 110 to analyze and/or adjust the orientation of a visual image (e.g., visual image 106 or visual image 200) prior to the context component 108 analyzing the visual image to determine whether the visual image comprises one or more context words, and prior to analyzing the visual image to determine, identify, and/or extract desired text information in or from the visual image.

Figure 3:
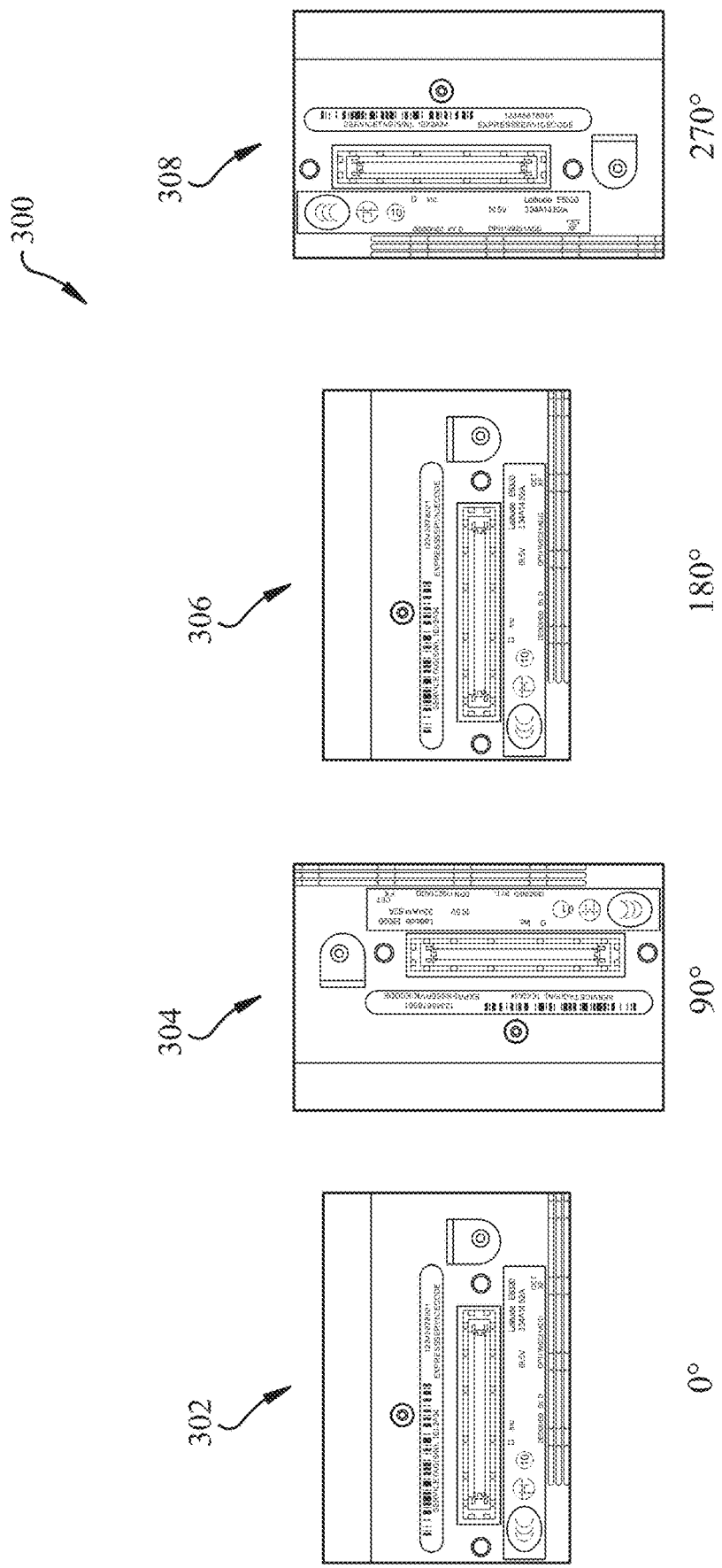
FIG. 3 presents a diagram of example images of the example visual image at various different orientations, in accordance with various aspects and embodiments of the disclosed subject matter.

Turning briefly to FIG. 3 (along with FIGS. 1 and 2), FIG. 3 presents a diagram of example images 300 of the example visual image 200 at various different orientations, in accordance with various aspects and embodiments of the disclosed subject matter. In some embodiments, the orientation component 110 can employ four categories of orientation, such as zero degrees orientation, 90 degrees orientation, 180 degrees orientation, and 270 degrees orientation, as presented in the various differently oriented versions of the example images 300. The example images 300 present the same visual image at the four different orientations as follows: visual image 302 at zero degrees orientation, visual image 304 at 90 degrees orientation, visual image 306 at 180 degrees orientation, and visual image 308 at 270 degrees orientation. For purposes of performing the disclosed scene text information extraction to extract text information from a visual image, it can be acceptable for a visual image to be askew by a relatively small amount (e.g., to be slightly askew), and, as a result, utilizing the four different orientations (e.g., zero degrees, 90 degrees, 180 degrees, and 270 degrees) typically can be suitable when performing the disclosed scene text information extraction. It is to be appreciated and understood that, while the disclosed subject matter describes using these four categories of orientation, the disclosed subject matter is not so limited, as, in accordance with other embodiments, the disclosed subject matter (e.g., orientation component 110) can utilize different and/or more categories of orientation to achieve a desired granularity and/or desired de-skewing of a visual image.

The orientation component 110 can analyze the orientation of the visual image 200 to determine whether the orientation of the visual image 200 is skewed. If, based at least in part on the results of such orientation analysis, the orientation component 110 determines that the visual image 200 is already at or substantially close to being at zero degrees relative to (e.g., when compared to) a reference line that can be at zero degrees (e.g., as depicted at reference numeral 302), the orientation component 110 can determine that no adjustment to the orientation of the visual image 200 is to be performed (e.g., no adjustment to the orientation is necessary). If, instead, based at least in part on the results of such orientation analysis, the orientation component 110 determines that the orientation of the visual image 200 is skewed (e.g., is not at or substantially close to zero degrees) relative to the zero-degree reference line (e.g., as depicted at reference numerals 304, 306, and 308), the orientation component 110 can re-orient the visual image 200 to be aligned at zero or substantially zero degrees (e.g., the orientation of the context word and/or potential text information can be aligned at zero or substantially zero degrees, when the words or characters are read left to right and/or top to bottom), such that the visual image 200 can appear to be as depicted at reference numeral 302, or at least substantially close to such zero-degree orientation.

In some embodiments, the orientation component 110 can comprise, be associated with, or can employ an artificial intelligence (AI) component 112, which can comprise one or more neural networks that can include a neural network that can be trained to identify or determine (e.g., automatically identify or determine) orientations of visual images based at least in part on training information (e.g., training example visual images) relating to orientations of visual images. For instance, the neural network of or associated with the AI component 112 and/or orientation component 110 can be trained to identify or determine the four (or different and/or more) categories of orientation (e.g., zero degrees, 90 degrees, 180 degrees, and 270 degrees) of the visual images based at least in part on the training information. In certain embodiments, the neural network of or associated with the AI component 112 and/or orientation component 110 can be a deep convolutional neural network that can be based on a desired residual neural network (ResNet), such as ResNet-18, which is a convolutional neural network that can be 18 layers deep, or another desired type of convolutional neural network.

In some embodiments, the IMC 102 can comprise a text detection component 114 that can perform (e.g., automatically perform) a text detection analysis, on the visual image (e.g., visual image 200) to facilitate determining, identifying, or predicting one or more text strings (e.g., candidate text strings) that potentially can be associated with a context word in the visual image, wherein the visual image can have its orientation aligned at zero or substantially zero degrees such that the orientation of the context word (e.g., SERVICE TAG 202) and/or potentially desired text information (e.g., 1EX2A34 (206)) can be aligned at zero or substantially zero degrees, when the words or characters are read left to right and/or top to bottom. In accordance with various embodiments, the text detection component 114 can perform or facilitate performing a character region awareness for text detection (CRAFT) analysis on the visual image to facilitate determining, identifying, or predicting the one or more text strings that potentially can be associated with the context word in the visual image. For instance, the text detection component 114 can comprise, be associated with, or can employ the AI component 112, which can comprise one or more neural networks that can be trained to perform the CRAFT analysis on the visual image (e.g., visual image 200) to identify, determine, or predict the one or more text strings that potentially can be associated with the context word in the visual image.

Based at least in part on the results of the text detection analysis (e.g., the CRAFT analysis), the text detection component 114 can identify, determine, predict, and/or localize (e.g., automatically identify, determine, predict, and/or localize) one or more candidate text strings (e.g., individual words, numbers, or other text strings) in the visual image (e.g., visual image 200). For instance, based at least in part on the results of the text detection analysis, the text detection component 114 can identify and localize one or more groupings of characters (e.g., alphabetical, numerical, or alphanumeric characters) in the visual image, wherein a grouping of characters can be characters that can be in relatively close proximity to (e.g., within a defined distance of) each other to form a candidate text string. The text detection analysis may not necessarily identify the particular characters of a grouping of characters, although, in certain embodiments, as part of the text detection analysis, the text detection component 114 can determine, identify, or predict (e.g., can make an initial or preliminary determination, identification, or prediction of) the particular characters of a grouping of characters in the visual image.

Figure 4:
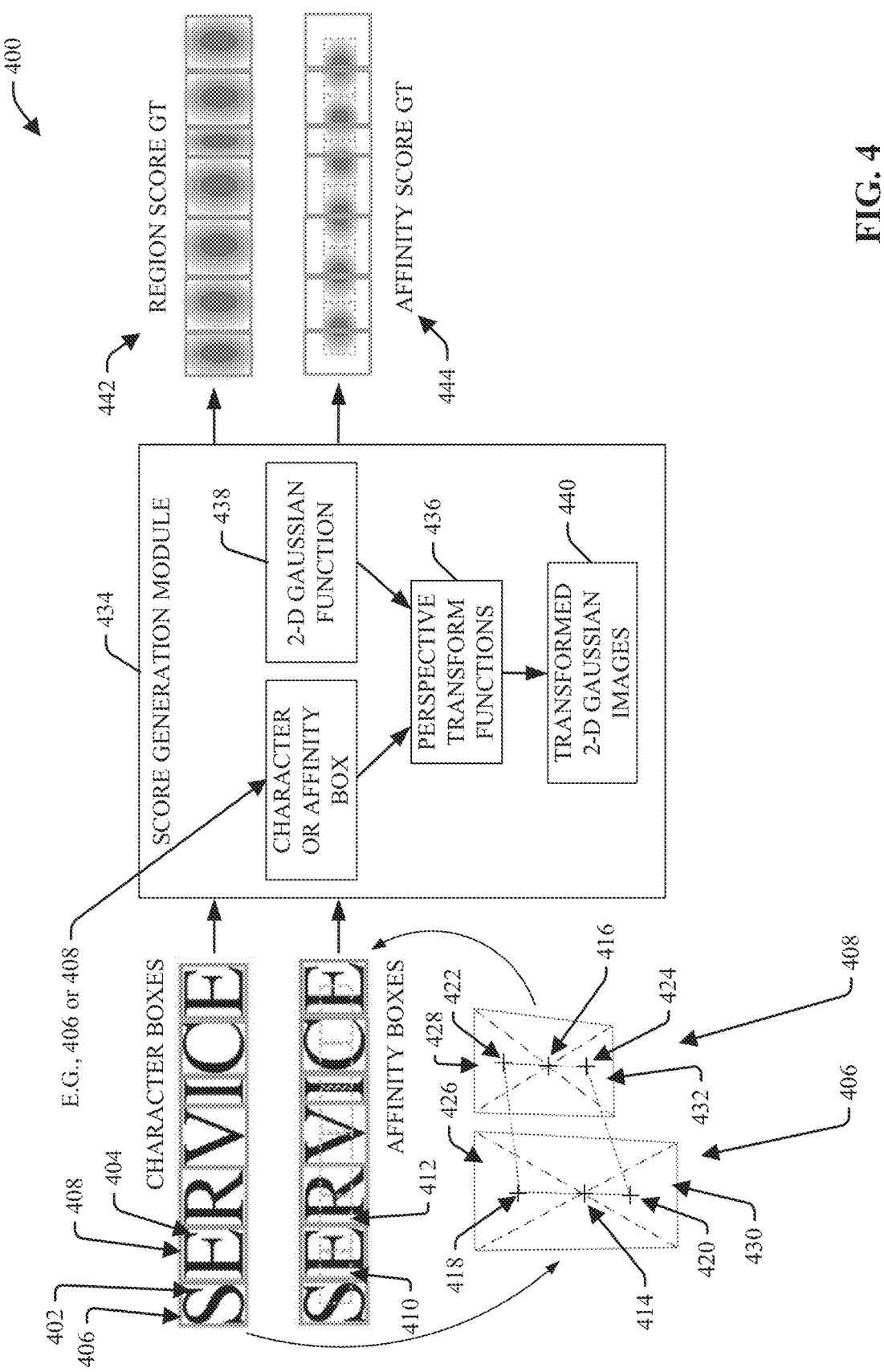
FIG. 4 depicts a diagram of an example character region awareness for text detection (CRAFT) process that can desirably identify, determine, or predict a text string and/or a context word, which can be associated with the text string, in accordance with various aspects and embodiments of the disclosed subject matter.

Referring to FIG. 4 (along with FIGS. 1 and 2), FIG. 4 depicts a diagram of an example CRAFT process 400 that can desirably (e.g., efficiently, suitably, or optimally) identify, determine, or predict a text string and/or a context word, which can be associated with the text string, in accordance with various aspects and embodiments of the disclosed subject matter. The text detection component 114 and/or AI component 112 can perform the CRAFT process 400, or at least a portion thereof. The text detection component 114 and/or AI component 112 can perform the CRAFT process 400 on a visual image (e.g., visual image 200) to identify, determine, predict, and/or localize one or more candidate text strings (e.g., individual words, numbers, or other text strings) in the visual image. In some embodiments, the neural network performing the CRAFT analysis can be, employ, or comprise a VGG-16 (which also can be referred to as VGGNet-16) backbone architecture (e.g., a VGG-16 sub-system) that can include 16 convolutional layers for performing the CRAFT analysis on a visual image (e.g., visual image 200). It is to be appreciated and understood that, in other embodiments, the neural network performing the CRAFT analysis can be, employ, or comprise another desired type of neural network (e.g., a VGG network comprising a different number of convolutional layers or a different type of neural network).

With regard to the CRAFT process 400, the text detection component 114 and/or AI component 112 can analyze a visual image 200 (e.g., as oriented to zero or substantially close to zero degrees). The analysis can comprise a character analysis of the characters identified in the visual image 200 and an affinity analysis of the affinity of characters to each other in the visual image 200. Based at least in part on the results of these analyses, the text detection component 114 and/or AI component 112 can identify characters in the visual image 200 and can place character boxes around the characters. For example, with regard to the text string of the word "SERVICE" in the visual image 200, based at least in part on the character analysis results, the text detection component 114 and/or AI component 112 can identify the characters of the text string for the word "SERVICE," including, for example, characters S 402 and E 404 (as well as the other characters R, V, I, C, E), and can place character boxes, such as, for example, character box 406 and character box 408, around the characters of the text string, wherein the respective character boxes can correspond or conform to the respective shapes and sizes of the respective characters of the text string. Based at least in part on the affinity analysis results, the text detection component 114 and/or AI component 112 can determine the respective affinities of the characters of the text string for the word "SERVICE" to each other. Based at least in part on the respective affinities, the text detection component 114 and/or AI component 112 can determine and generate affinity boxes, including, for example, affinity box 410 and affinity box 412, wherein the respective affinity boxes can correspond to and/or can indicate the respective affinities of the respective characters of the text string to each other (e.g., affinity box 410 can correspond to and/or can indicate the affinity between character S 402 and character E 404). In certain embodiments, for each character box (e.g., character box 406, character box 408), the text detection component 114 and/or AI component 112 can use diagonal lines to divide the character box into four triangles that can meet at a center point (e.g., center point 414, center point 416) of the character box (e.g., character box 406, character box 408). Also, for each character box (e.g., character box 406, character box 408), the text detection component 114 and/or AI component 112 can determine the center points (e.g., center point 418, center point 420, center point 422, center point 424) of the top triangle (e.g., top triangle 426, top triangle 428) and bottom triangle (e.g., bottom triangle 430, bottom triangle 432) of the character box (e.g., character box 406, character box 408). The text detection component 114 and/or AI component 112 can determine and generate an affinity box (e.g., affinity box 410) that can have the center points (e.g., center points 418, 420, 422, and 424) of the top and bottom triangles (e.g., triangles 426, 428, 430, and 432) as the corner points of the affinity box, and the left and right side lines of the affinity box can respectively pass through the center points (e.g., center points 414 and 416) of the character boxes (e.g., character boxes 406 and 408).

As part of the CRAFT analysis, the text detection component 114 and/or AI component 112 can employ a score generation module 434 to determine respective region scores and respective affinity scores with regard to the respective characters (e.g., characters S 402 and E 404). In some embodiments, the text detection component 114 and/or AI component 112, employing the score generation module 434, can analyze the character boxes (e.g., character box 406, character box 408) of the characters, and can apply respective perspective transform functions 436 to a two-dimensional (2-D) Gaussian function 438 to determine and generate respective transformed 2-D images 440 that can represent the respective characters, wherein a perspective transform function 436 associated with a particular character can be determined or structured based at least in part on the perspective or shape of the particular character box (e.g., character box 406 or character box 408) and particular character (e.g., character S 402 or character E 404) under consideration, and wherein each character can have a respective transformed 2-D image 440 associated with (e.g., relating to or representing) that character based at least in part on the respective features (e.g., shape, size, or other dimensional features) of the particular character. The text detection component 114 and/or AI component 112 can determine and generate a region score 442 (e.g., region score GT) based at least in part on the respective transformed 2-D images 440 of the respective characters of the visual image 200. The region score 442 can be or can indicate the probability that a given pixel in the visual image 200 is the center of a character.

The text detection component 114 and/or AI component 112, employing the score generation module 434, also can analyze the affinity boxes (e.g., affinity box 410) of the characters, and can apply respective perspective transform functions 436 to the two-dimensional (2-D) Gaussian function 438 to determine and generate respective transformed 2-D images 440 that can represent the respective affinities between two characters (e.g., two adjacent characters), for each pair of characters, in the visual image 200, wherein respective perspective transform functions 436 can be determined or structured based at least in part on the perspective or shape of the respective affinity boxes (e.g., affinity box 410 or affinity box 412) under consideration, and wherein each affinity box associated with two characters can have a respective transformed 2-D image 440 associated with (e.g., relating to or representing) that affinity box and associated affinity based at least in part on the respective features (e.g., shape, size, or other dimensional features) of the particular affinity box. The text detection component 114 and/or AI component 112 can determine and generate an affinity score 444 (e.g., affinity score GT) based at least in part on the respective transformed 2-D images 440 of the respective affinity boxes (e.g., affinity box 410) associated with the characters identified in the visual image 200. The affinity score 444 can be or can indicate the probability that a given pixel in the visual image 200 is the center of the space between adjacent characters in the visual image 200.

Based at least in part on the CRAFT analysis results, the text detection component 114 and/or AI component 112 can determine, identify, or predict (e.g., automatically determine, identify, or predict) one or more text strings (e.g., one or more groups of characters that are associated with each other, for example, to form an individual word, an individual number, or other type of text string) and/or one or more context words in the visual image 200. For instance, in the visual image 200, based at least in part on the CRAFT analysis results, the text detection component 114 and/or AI component 112 can determine, identify, or predict a first text string (e.g., 1EX2A34 (206)) and a second text string (e.g., 12345678901 (208)) and/or can determine, identify, or predict text strings associated with the context words (e.g., SERVICE TAG 202 (as well as context word: S/N) and EXPRESS SERVICE CODE 204).

Figure 5:
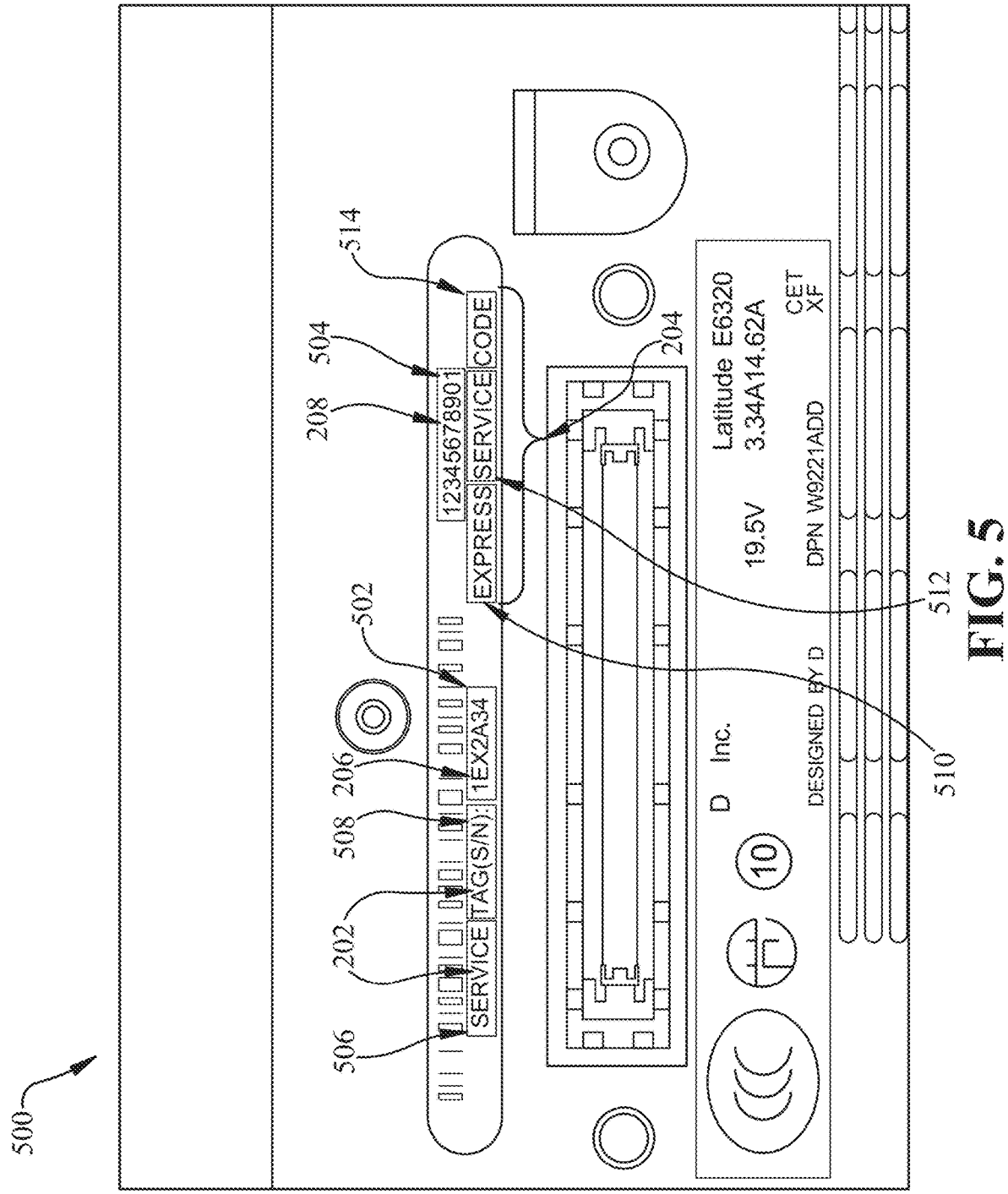
FIG. 5 depicts a diagram of an example visual image that can comprise bounding boxes around text strings based at least in part on the results of a CRAFT analysis of the visual image, in accordance with various aspects and embodiments of the disclosed subject matter.

In some embodiments, the IMC 102 can comprise a bounding box component 116 that can apply or place respective bounding boxes around the respective text strings identified or predicted in the visual image 200. In that regard, referring briefly to FIG. 5 (along with FIGS. 1, 2, and 4), FIG. 5 depicts a diagram of an example visual image 500 that can comprise bounding boxes around text strings based at least in part on the results of a CRAFT analysis of the visual image, in accordance with various aspects and embodiments of the disclosed subject matter. Based at least in part on the CRAFT analysis results, the bounding box component 116 can apply or place (e.g., automatically apply or place) a bounding box 502 around the first text string 1EX2A34 (206), a bounding box 504 around the second text string 12345678901 (208). With regard to context words SERVICE TAG 202 (and the associated S/N), the bounding box component 116 can apply or place a bounding box 506 around the text string for "SERVICE," and bounding box 508 around the text string for "TAG(S/N)." With regard to context words EXPRESS SERVICE CODE 204, the bounding box component 116 can apply or place a bounding box 510 around the text string for "EXPRESS," bounding box 512 around the text string for "SERVICE," and bounding box 514 around the text string for "CODE."

In some embodiments, based at least in part on the CRAFT analysis results, the text detection component 114 can determine, identify, and localize one or more text strings, which can be one or more groupings of characters (e.g., alphabetical, numerical, or alphanumeric characters) in the visual image (e.g., visual image 200), and/or can determine, identify, and/or predict (e.g., make an initial or preliminary determination, identification, and/or prediction of) the respective characters of each of the text strings. It is noted that, in other embodiments, the CRAFT analysis may not necessarily identify the particular characters in a grouping of characters, but rather can at least determine, identify, predict, and/or localize respective groupings of characters (e.g., respective text strings) and/or certain respective features of the respective characters and/or respective groupings of characters.

In certain embodiments, the text detection component 114 or bounding box component 116 can generate, and can provide as an output for further analysis by the IMC 102, respective images of the one or more respective candidate text strings in the respective bounding boxes (e.g., the first text string 1EX2A34 (206) in bounding box 502, the second text string 12345678901 (208) in bounding box 504) and/or the one or more respective context words in the respective bounding boxes (e.g., SERVICE TAG 202 (and the associated S/N) in bounding boxes 506 and 508; and EXPRESS SERVICE CODE 204 in bounding boxes 510, 512, and 514).

The IMC 102 also can comprise a text recognition component 118 that can perform (e.g., automatically perform) a text recognition analysis (e.g., a deep text recognition (DTR) analysis, such as a generalized DTR analysis) on one or more candidate text strings (e.g., the respective images of the respective candidate text strings) identified in a visual image (e.g., visual image 200) to determine, identify, or predict the one or more text strings (e.g., respective characters of the one or more candidate text strings). In some embodiments, the text recognition component 118 can comprise or be associated with the AI component 112 to perform the text recognition analysis on the one or more candidate text strings associated with (e.g., identified in) the visual image (e.g., visual image 200).

In certain embodiments, the text recognition component 118 and/or AI component 112 can perform a multi-stage (e.g., four stage) DTR analysis on the one or more respective images of the one or more candidate text strings (e.g., the first text string 1EX2A34 (206) in bounding box 502, the second text string 12345678901 (208) in bounding box 504). The text recognition component 118 and/or AI component 112 can comprise or utilize a trained DTR model (e.g., a trained four-stage DTR model) that can comprise a transformation stage, feature extraction stage, sequence modeling stage, and a prediction stage, and can predict the text string in an image (e.g., predict the characters of the first text string 1EX2A34 (206) in bounding box 502). The trained DTR model can be trained on datasets, such as, for example, open source datasets or other datasets (e.g., particular or unique datasets), which can largely comprise words and numbers. The trained DTR model typically can perform well on all alpha text strings (e.g., "SERVICE" and "TAG") and all numeric text strings (e.g., "1234"), but when trained using datasets comprising words and numbers, the DTR model may not perform as well on alphanumeric text strings (e.g., "1EX2A34"). However, in certain embodiments, the AI component 112 can comprise or utilize a specialized DTR network and trained specialized DTR model, as more fully described herein, that can be trained to desirably (e.g., accurately, reliably, or optimally) recognize characters (e.g., alphanumeric characters, symbols, or other types of characters) in alphanumeric text strings and other text string types that may not be available or common in typically available datasets, such as open source datasets.

Figure 6:
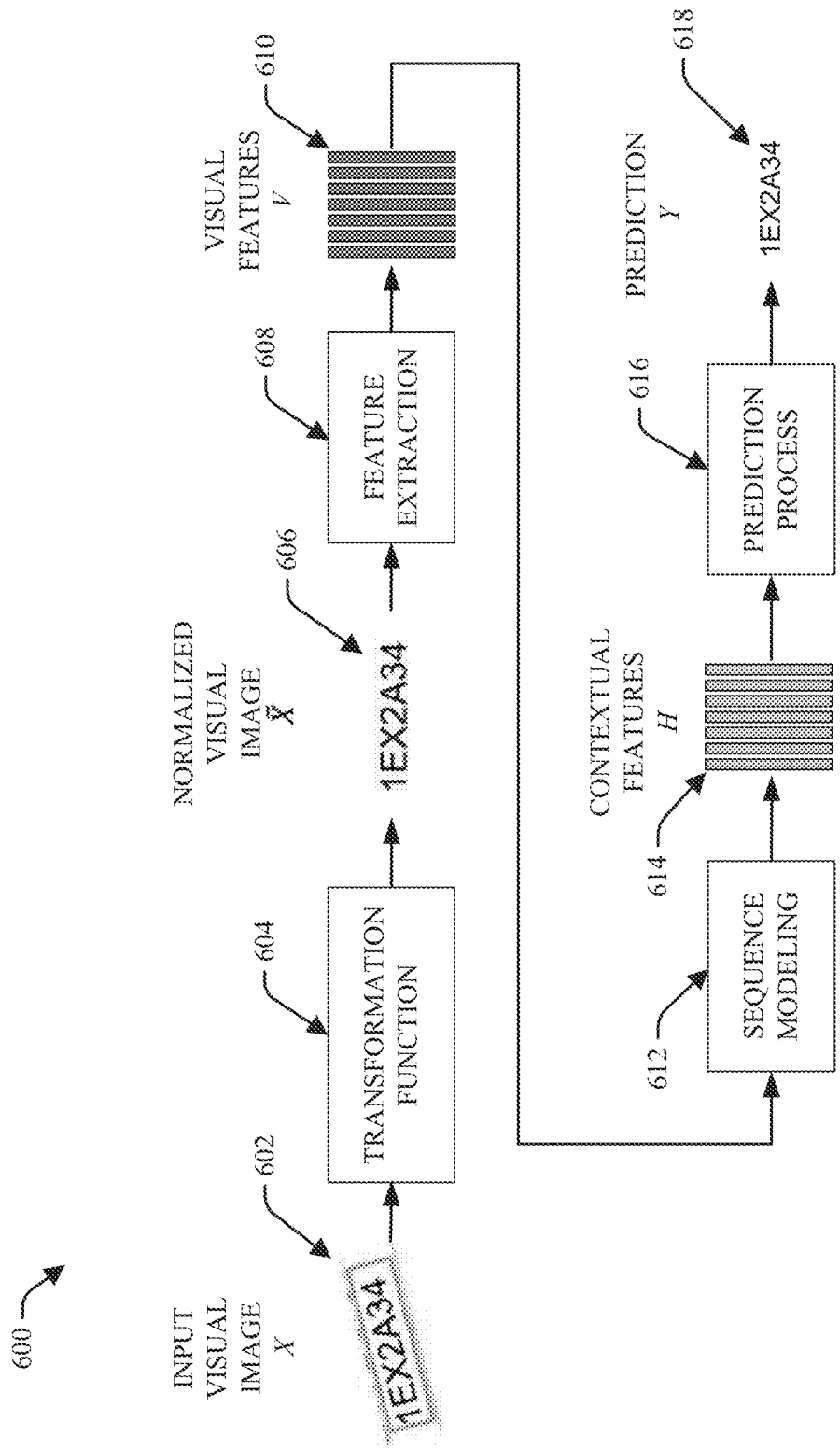
FIG. 6 depicts a diagram of an example deep text recognition (DTR) process that can be performed to predict the characters of a candidate text string, in accordance with various aspects and embodiments of the disclosed subject matter.

Turning briefly to FIG. 6 (along with FIGS. 1, 2, and 5), FIG. 6 depicts a diagram of an example DTR process 600 that can be performed to predict the characters of a candidate text string, in accordance with various aspects and embodiments of the disclosed subject matter. The example DTR process 600 will be described with regard to example input visual image X 602, which can be, for example, the first text string 1EX2A34 (206) in bounding box 502.

As part of the example DTR process 600, for each visual image of a candidate text string (e.g., the first text string 1EX2A34 (206) in bounding box 502), the text recognition component 118 and/or AI component 112 can receive the input visual image X 602. The text recognition component 118 and/or AI component 112 can analyze the input visual image X 602, and can apply (e.g., automatically apply) a desired transformation function 604 to the input visual image X 602 to normalize the input visual image X 602 and generate a normalized visual image $\ddot{X}$ 606 as an output of the desired transformation function 604. In some embodiments, as part of the DTR process 600 and analysis of the input visual image X 602, the AI component 112 can comprise or utilize a spatial transformer network (STN) or other desired transformation network that can apply the desired transformation function 604 (e.g., STN or other desired transformation function) to the input visual image X 602, and can normalize the input visual image X 602 and generate the normalized visual image $\ddot{X}$ 606 as an output based at least in part on the application of the desired transformation function 604 to the input visual image X 602.

As part of the DTR process 600 and analysis, the text recognition component 118 and/or AI component 112 can perform (e.g., automatically perform) feature extraction 608 to analyze the normalized visual image $\ddot{X}$ 606, and, based at least in part on such analysis (e.g., feature extraction analysis), extract various features, including visual features V 610, from the normalized visual image $\ddot{X}$ 606. The visual features V 610 of the normalized visual image $\ddot{X}$ 606 can comprise various respective features of the respective characters of the candidate text string (e.g., the first text string 1EX2A34 (206) in bounding box 502). In some embodiments, the AI component 112 can comprise or can utilize a desired neural network (e.g., a trained neural network), such as, for example, a ResNet, that can analyze the normalized visual image $\ddot{X}$ 606, extract the various features, including visual features V 610, from the normalized visual image $\ddot{X}$ 606, and generate a visual feature map that can comprise information relating to the various features (e.g., visual features V 610) extracted from the normalized visual image $\ddot{X}$ 606.

As part of the DTR process 600 and analysis, the AI component 112 also can perform (e.g., automatically perform) sequence modeling 612 that can analyze the information relating to the features (e.g., information regarding the visual features V 610 contained in the visual feature map) extracted from the normalized visual image $\ddot{X}$ 606 and, based at least in part on such analysis (e.g., sequence modeling analysis), can sequence such features and determine contextual features H 614 of or associated with the normalized visual image $\ddot{X}$ 606 and/or visual features extracted from the normalized visual image Ẍ 606. In certain embodiments, the AI component 112 can comprise or can utilize a trained neural network, such as, for example, a bidirectional long short-term memory network (BiLSTM network), that can analyze the sequence of features (e.g., sequence of visual features V 610 contained in the visual feature map), and based at least in part on the results of such analysis, can determine an enhanced (e.g., improved, better, or optimal) sequence of or comprising such visual features and/or can determine the contextual features H 614 of or associated with the normalized visual image Ẍ 606 and/or visual features extracted from the normalized visual image Ẍ 606 to facilitate enhancing the sequence of features, which can comprise visual, contextual, and/or other features extracted or determined from the normalized visual image Ẍ 606. A BiLSTM network can be a sequence processing model that can comprise two LSTM networks, with one LSTM network taking, analyzing, and performing operations on input data (e.g., information regarding the visual features V 610 contained in the visual feature map) in a forward direction and the other LSTM network taking, analyzing, and performing operations on the input data in a backward direction.

Also, as part of the DTR process 600 and analysis, the text recognition component 118 and/or AI component 112 can perform (e.g., automatically perform) a prediction process 616 and generate (e.g., automatically generate) a prediction Y 618 of the characters (e.g., the respective characters of 1EX2A34 (206)) of the candidate text string (e.g., the first text string 1EX2A34 (206) in bounding box 502) based at least in part on the results of the sequence modeling 612, including information relating the contextual features H 614 and/or visual features V 610 extracted or determined from the normalized visual image Ẍ 606 (e.g., information regarding the enhanced sequence of features comprising the contextual features H 614 and/or visual features V 610 extracted or determined from the normalized visual image Ẍ 606). In certain embodiments, the text recognition component 118 and/or AI component 112 can perform the prediction process 616 by making an attention-based sequence prediction (Attn) that can predict an output sequence (e.g., the sequence of the characters of the candidate text string under consideration) by capturing the information flow within the input sequence (e.g., the information regarding the enhanced sequence of features comprising the contextual features H 614 and/or visual features V 610 extracted or determined from the normalized visual image Ẍ 606).

The text recognition component 118 and/or AI component 112 can perform the DTR process 600 with regard to each item of textual information (e.g., each text string) in a visual image (e.g., visual image 200 and/or corresponding visual image 500 with bounding boxes) under consideration to predict each item of textual information (e.g., predict characters and/or location of each item of textual information) in the visual image, wherein the item(s) of textual information can include the candidate text strings (e.g., the first text string 1EX2A34 (206) in bounding box 502, the second text string 12345678901 (208) in bounding box 504) and/or context words (e.g., SERVICE TAG 202 (and the associated S/N) in bounding boxes 506 and 508; and EXPRESS SERVICE CODE 204 in bounding boxes 510, 512, and 514) contained in the visual image (e.g., visual image 200 and/or corresponding visual image 500 with bounding boxes).

In accordance with various embodiments, the IMC 102 can perform (e.g., automatically perform) a bounding box prediction to predict a text string associated with a context word in a visual image (e.g., visual image 200 and/or corresponding visual image 500 with bounding boxes) based at least in part on the results of the DTR process 600 (e.g., prediction Y 618 of the characters (e.g., the respective characters of 1EX2A34 (206)) of a candidate text string) and/or the respective locations of candidate text strings identified in the visual image in relation to the context word under consideration, in accordance with defined information management criteria.

In some embodiments, as part of performing a bounding box prediction to predict or determine a target text string associated with a context word with regard to a visual image (e.g., visual image 500), the IMC 102 can utilize (e.g., execute) a rules-based algorithm(s) and technique(s), which can comprise and/or apply a set of inline grouping rules, wherein the IMC 102 can apply the set of inline grouping rules to determine or predict a particular candidate text string (e.g., a target text string) that can be associated with a particular context word identified in the visual image (e.g., visual image 500), with regard to each context word and/or each candidate text string. In certain embodiments, in addition to, or as an alternative to, using the rules-based algorithm(s) and technique(s), the IMC 102 can utilize (e.g., execute) an AI algorithm(s) (e.g., an AI or machine learning algorithm(s)) and technique(s) to determine or predict a particular candidate text string that can be associated with a particular context word identified in the visual image (e.g., visual image 500), with regard to each context word and/or each candidate text string.

In some embodiments, the IMC 102 can comprise an inline grouper component 120 that can that perform (e.g., automatically perform) an inline grouping analysis on candidate text strings associated with a visual image (e.g., visual image 500) in relation to a context word to determine or facilitate determining or predicting which candidate text string is the target text string associated with the context word. Employing the rules-based techniques, including application of a set of inline grouping rules, as part of the inline grouping analysis, for each context word identified in the visual image, the inline grouper component 120 can analyze the locations of the candidate bounding boxes associated with the candidate text strings identified in the visual image in relation to the location of the bounding box of the context word to identify candidate bounding boxes associated with candidate text strings that are in line (e.g., aligned) with the bounding box of the context word. The inline grouping approach is based on an assumption that a context word and a target text string typically can be an inline group (e.g., they can be in line or aligned with each other). A context word and candidate text string can be an inline group when they are in line with each other either horizontally or vertically. A horizontal inline group can have both the context word and the target text string on a single horizontal line. A vertical inline group can be inline when both the context word and target text string are aligned vertically in relation to each other, and/or the context word and/or target text string are left justified, right justified, or center justified.

Based at least in part on the results of the inline grouping analysis of the locations of the candidate text strings in relation to the location of a context word identified in the visual image (e.g., visual image 500), the inline grouper component 120 can predict or determine (e.g., automatically predict or determine) a target bounding box associated with a target text string that is associated with the bounding box associated with the context word, or at least can predict or determine a subset of candidate bounding boxes associated with candidate text strings that potentially can be the target bounding box associated with the target text string, in accordance with the set of inline grouping rules, wherein the subset of candidate bounding boxes associated with candidate text strings usually can comprise a number of candidate bounding boxes that can be significantly less than the total number of candidate bounding boxes identified in the visual image. That is, employing the inline grouping analysis, the inline grouper component 120 usually can significantly reduce the number of candidate bounding boxes associated with candidate text strings identified in the visual image.

As part of the inline grouping analysis, with regard to each candidate bounding box of the subset of candidate bounding boxes associated with candidate text strings identified in the visual image (e.g., visual image 500), the inline grouper component 120 also can analyze the text recognition (e.g., DTR) prediction of the candidate text string associated with the candidate bounding box to determine whether the text recognition prediction conforms to an expected text string associated with the context word, in accordance with an inline grouping rule that can indicate that the target text string (e.g., a conforming or compatible target text string) is to conform or correspond to a type of text string that can be associated with the context word. For example, if the context word is a service tag, and a service tag has seven alphanumeric characters, with regard to each candidate bounding box of the subset of candidate bounding boxes associated with candidate text strings, the inline grouper component 120 can determine whether the candidate text string associated with the candidate bounding box has seven alphanumeric characters, in accordance with the applicable inline grouping rule. If not, the inline grouper component 120 can determine that such candidate text string is not the target text string that can be associated with the context word. If the inline grouper component 120 determines that the candidate text string has seven alphanumeric characters, the inline grouper component 120 can determine that the candidate text string is the target text string, or at least potentially can be the target text string, and, if there are any other candidate bounding boxes in the subset to analyze, the inline grouper component 120 can continue the inline grouping analysis.

If there multiple candidate bounding boxes associated with candidate text strings that remain in that such candidate bounding boxes are in line (e.g., aligned) with the context word and conform to the type of text string that can be associated with the context word, the inline grouper component 120 can determine the respective distances (e.g., Euclidean distances) of the respective remaining candidate bounding boxes from the bounding box of the context word, based at least in part on the result of analysis of the visual image and/or the text recognition (e.g., DTR) analysis. The inline grouper component 120 can determine or predict that the candidate bounding box of the remaining candidate bounding boxes that is in closest proximity to (e.g., shortest distance to) the bounding box of the context word, as compared to the other remaining candidate bounding box(es), can be the target bounding box associated with the target text string that can be associated with the context word, in accordance with an inline grouping rule relating to distances between the candidate bounding boxes and the bounding box associated with the context word.

To further illustrate, with further regard to FIG. 5 and inline grouping, with regard to the context word(s) SERVICE TAG 202 (and/or S/N) identified in the visual image 500, the inline grouper component 120 can analyze the locations of the bounding boxes associated with candidate text strings (e.g., candidate bounding box 502 associated with candidate text string 1EX2A34 (206), and candidate bounding box 504 associated with candidate text string 12345678901 (208)) identified in the visual image 500 in relation to the location of the bounding box(es) (e.g., bounding boxes 506 and 508) associated with the context word(s) SERVICE TAG 202. Based at least in part on such inline grouping analysis results and application of the set of inline grouping rules, the inline grouper component 120 can determine (e.g., automatically determine) that the location of the candidate bounding box 502 associated with the candidate text string 1EX2A34 (206) is horizontally in line with the location of the bounding boxes 506 and 508 associated with the context word(s) SERVICE TAG 202, and also can determine that the location of the candidate bounding box 504 associated with the candidate text string 12345678901 (208) is not in line, either horizontally or vertically, with the location of the bounding boxes 506 and 508 associated with the context word(s) SERVICE TAG 202. Since the bounding boxes 510, 512, and 514 are associated with another context word(s) EXPRESS SERVICE CODE 204, the inline grouper component 120 can disregard those bounding boxes 510, 512, and 514, even though they are horizontally in line with the bounding boxes 506 and 508 associated with the context word(s) SERVICE TAG 202, because the other context word(s) EXPRESS SERVICE CODE 204 is not a candidate text string.

Also, based at least in part on the text recognition (e.g., DTR) results, the inline grouper component 120 also can determine or predict (e.g., automatically determine or predict) that the candidate text string 1EX2A34 (206) has seven alphanumeric characters and that satisfies the applicable inline rule associated with the context word(s) SERVICE TAG 202, wherein such applicable inline grouping rule can indicate or specify that an appropriate target text string has seven alphanumeric characters as the target text string format. This can further indicate or demonstrate that the candidate text string 1EX2A34 (206) can be the target text string associated with the context word(s) SERVICE TAG 202. As a further result of this inline grouping analysis and application of the set of inline grouping rules, the inline grouper component 120 can determine or predict that the candidate text string 1EX2A34 (206) can be the target text string that can be associated with the context word(s) SERVICE TAG 202 (and/or S/N).

It is to be appreciated and understood that inline grouping rules can have varying degrees of granularity, as desired, in accordance with the defined information management criteria. For instance, while this particular inline grouping rule indicates that the format of a target text string with regard to the context word(s) SERVICE TAG 202 comprises seven alphanumeric characters, if and as desired, an inline grouping rule can be more specific or granular with regard to the appropriate (e.g., allowable) format of a target text string. As an example, an inline grouping rule can more particularly indicate or specify that the format of a target text string with regard to the context word(s) SERVICE TAG 202 is to be comprised of seven alphanumeric characters in the form of a number for the first character of the target text string, followed by two alphabetical characters in the second and third position of the target text string, followed by another number in the fourth position of the target text string, followed by another alphabetical character in the fifth position of the target text string, and followed by two numbers in the sixth and seventh position of the target text string.

The format of a text strings can be based at least in part on the type of context word(s) (e.g., anchor word(s)), product label, invoice, purchase order, or other type of information or document), the manufacturer of the product(s) associated with the text strings, the model(s) of the product(s), the language(s) associated with the product(s), or another desired factor. For example, a first text string format of a first type of text string can be based at least in part on a first type of context word associated with the first type of text string, a first manufacturer of the product with regard to which the first type of text string is to be used, and/or a first model of the product. A second text string format of a second type of text string can be based at least in part on a second (or first) type of context word associated with the second type of text string, a second (or first) manufacturer of the product with regard to which the second type of text string is to be used, and/or a second (or first) model of the product, wherein the second text string format can be different from the first text string format.

With regard to the context word(s) EXPRESS SERVICE CODE 204 identified in the visual image 500, the inline grouper component 120 can analyze the locations of the bounding boxes associated with candidate text strings (e.g., candidate bounding box 502 associated with candidate text string 1EX2A34 (206), and candidate bounding box 504 associated with candidate text string 12345678901 (208)) identified in the visual image 500 in relation to the location of the bounding box(es) (e.g., bounding boxes 510, 512, and 514) associated with the context word(s) EXPRESS SERVICE CODE 204. Based at least in part on such inline grouping analysis results and application of the set of inline grouping rules, the inline grouper component 120 can determine that the location of the candidate bounding box 504 associated with the candidate text string 12345678901 (208) is vertically in line (e.g., vertically in line in a center justified manner) with the location of the bounding boxes 510, 512, and 514 associated with the context word(s) EXPRESS SERVICE CODE 204.

Based at least in part on such inline grouping analysis results and application of the set of inline grouping rules, the inline grouper component 120 also can determine that the location of the candidate bounding box 502 associated with the candidate text string 1EX2A34 (206) is horizontally in line with the location of the bounding boxes 510, 512, and 514 associated with the context word(s) EXPRESS SERVICE CODE 204. However, even though both of those candidate bounding boxes associated with candidate text strings are determined to be in line with the bounding boxes 510, 512, and 514 associated with the context word(s) EXPRESS SERVICE CODE 204, the inline grouper component 120 can further determine that the distance between the candidate bounding box 504 associated with the candidate text string 12345678901 (208) and the bounding boxes 510, 512, and 514 associated with the context word(s) EXPRESS SERVICE CODE 204 is shorter than the distance between the candidate bounding box 502 associated with the candidate text string 1EX2A34 (206) and the bounding boxes 510, 512, and 514 associated with the context word(s) EXPRESS SERVICE CODE 204. Applying the inline grouping rule relating to distance between candidate text strings and the context word, the inline grouper component 120 can predict or determine, or at least can have an indication (e.g., a further indication), that the candidate text string 12345678901 (208) is the target text string associated with the context word(s) EXPRESS SERVICE CODE 204, as opposed to the candidate text string 1EX2A34 (206).

Additionally or alternatively, the inline grouper component 120 can determine that the candidate bounding box 502 associated with the candidate text string 1EX2A34 (206) is located to the left, as opposed to the right, of the bounding boxes 510, 512, and 514 associated with the context word(s) EXPRESS SERVICE CODE 204, wherein an inline grouping rule can indicate or specify that a target text string can be located in line and to the right of the context word, rather than to the left of the context word. Applying such inline grouping rule relating to the location of candidate text strings in relation to (e.g., to the left or right of) the context word, the inline grouper component 120 can predict or determine, or at least can have an indication (e.g., a further indication), that the candidate text string 12345678901 (208) is the target text string associated with the context word(s) EXPRESS SERVICE CODE 204, as opposed to the candidate text string 1EX2A34 (206).

Also, based at least in part on the text recognition (e.g., DTR) results, the inline grouper component 120 also can determine or predict that the candidate text string 12345678901 (208) has eleven numeric characters and that satisfies the applicable inline rule associated with the context word(s) EXPRESS SERVICE CODE 204, and the candidate text string 1EX2A34 (206) has seven alphanumeric characters and that does not satisfy such applicable inline rule, wherein such applicable inline rule can indicate or specify that an appropriate target text string has eleven numeric characters. Applying such inline grouping rule relating to the format of candidate text strings that can appropriately be associated with the context word(s) EXPRESS SERVICE CODE 204, the inline grouper component 120 can predict or determine, or at least can have an indication (e.g., a further indication), that the candidate text string 12345678901 (208) is the target text string associated with the context word(s) EXPRESS SERVICE CODE 204, as opposed to the candidate text string 1EX2A34 (206). From the inline grouping analysis and application of the inline grouping rules, such as described herein, the inline grouper component 120 can determine or predict that the candidate text string 12345678901 (208) can be the target text string that can be associated with the context word(s) EXPRESS SERVICE CODE 204.

Figure 7:
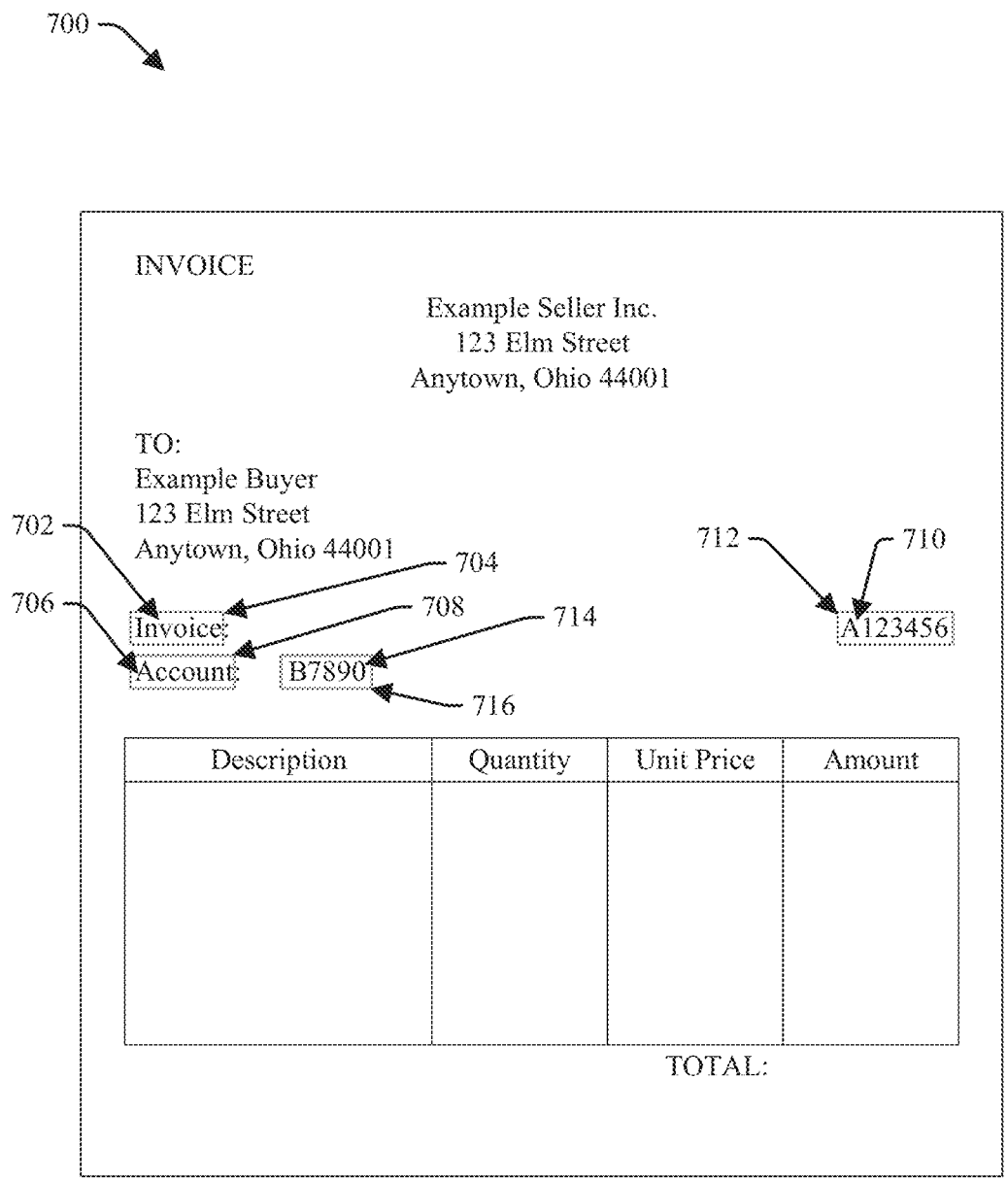
FIG. 7 illustrates a diagram of an example invoice form image of an example invoice form that can comprise text strings and context words, in accordance with various aspects and embodiments of the disclosed subject matter.

In some instances, depending on the applicable inline grouping rules, a candidate text string can be predicted or determined to be a target text string with regard to a context word(s), even though the candidate text string is located further away from the context word(s) within the visual image. In that regard, referring to FIG. 7 (along with FIGS. 1, 2, and 5), FIG. 7 illustrates a diagram of an example invoice form image 700 of an example invoice form that can comprise text strings and context words, in accordance with various aspects and embodiments of the disclosed subject matter. The example invoice form image 700 can comprise context word INVOICE 702 associated with bounding box 704 and context word ACCOUNT 706 associated with bounding box 708, which can be determined or identified in the invoice form image 700 by the IMC 102, as more fully described herein. The example invoice form image 700 also can comprise candidate text string A123456 (710) associated with bounding box 712 and candidate text string B7890 (714) associated with bounding box 716, which can be determined or identified in the invoice form image 700 by the IMC 102, as more fully described herein. As can be observed in the invoice form image 700, the location of the candidate text string A123456 (710) can be right justified on the invoice form, the context word INVOICE 702 can be left justified on the invoice form, and the location of the candidate text string B7890 (714) can be relatively closer in distance to the bounding box 704 associated with the context word INVOICE 702 than the location of the candidate text string A123456 (710).

With regard to the context word INVOICE 702, the inline grouper component 120 can determine that the location of the bounding box 712 associated with the candidate text string A123456 (710) is horizontally in line with the location of the bounding box 704 associated with the context word INVOICE 702, and also can determine the location of the bounding box 716 associated with the candidate text string B7890 (714) is not in line with the location of the bounding box 704 associated with context word INVOICE 702, in accordance with the inline grouping rule that can indicate or specify when a candidate text string is in line (e.g., horizontally in line) with a context word. Even though the location of the candidate text string B7890 (714) is relatively closer in distance to the bounding box 704 associated with the context word INVOICE 702 than the location of the candidate text string A123456 (710), based at least in part on such inline grouping rule, the inline grouper component 120 can predict or determine that the candidate text string A123456 (710) can be the target text string that can be associated with the context word INVOICE 702 due in part to the candidate text string A123456 (710) being determined to be horizontally in line with the location of the bounding box 704 associated with the context word INVOICE 702, and due in part to the location of the bounding box 716 associated with the candidate text string B7890 (714) being determined to not be in line with the location of the bounding box 704 associated with context word INVOICE 702. The inline grouper component 120 also can perform a check on the format of the candidate text string A123456 (710) to confirm that the candidate text string A123456 (710) conforms to the text string format associated with the context word INVOICE 702, in accordance with an applicable inline grouping rule that can indicate an appropriate (e.g., compatible) text string format of a text string associated with the context word INVOICE 702 (e.g., text string format: seven alphanumeric characters comprising an alphabetical character followed by six numerical characters), as more fully described herein.

As disclosed, in certain embodiments, in addition to, or as an alternative to, using the rules-based algorithm(s) and technique(s), the IMC 102 can utilize (e.g., execute) an AI algorithm(s) (e.g., an AI or machine learning algorithm(s)) and technique(s) to determine or predict a desired (e.g., appropriate or qualifying) candidate text string that can be associated with a particular context word identified in the visual image (e.g., visual image 500), with regard to each context word and/or each candidate text string identified in the visual image. In some embodiments, the IMC 102 can apply AI (e.g., AI or machine learning) techniques and algorithms that can utilize the locational coordinates of the bounding boxes (e.g., 506 and 508; and/or 510, 512, and 514) associated with context words (e.g., 202; and/or 204) and candidate bounding boxes (e.g., 502; and/or 504) associated with candidate text strings (e.g., 206; and/or 208) as input data to a desired trained neural network of or associated with the AI component 112. The desired neural network can be trained to understand or determine the relative position of a bounding box of a context word to a candidate bounding box of a candidate text string, based at least in part on application of a set of training examples of visual images comprising context words and text strings to the neural network. For each candidate bounding box of a set of candidate bounding boxes (e.g., 502, 504) associated with candidate text strings (e.g., 206, 208) that can be associated with the context word (e.g., SERVICE TAG 202), the desired trained neural network can determine (e.g., automatically determine or calculate) a probability (e.g., prob-ability value, amount, or level) that the candidate bounding box contains the target text string associated with the context word. The IMC 102 and/or AI component 112 can analyze the respective probabilities associated with the respective candidate bounding boxes, and, based at least in part on the analysis results, can determine or predict (e.g., automatically determine or predict) that the candidate bounding box (e.g., 502) associated with the highest probability, as compared to the other probabilities associated with the other candidate bounding boxes (e.g., 504), contains the target text string (e.g., 1EX2A34 (206)), in accordance with the defined information management criteria.

In other embodiments, additionally or alternatively, the IMC 102 and/or AI component 112 can apply or facilitate applying other AI (e.g., AI or machine learning) techniques and algorithms, wherein, for each candidate text string (e.g., 206, 208) and each context word (e.g., 202, 204) identified in a visual image (e.g., visual image 200 or visual image 500), a trained neural network of or associated with the AI component 112 can extract (e.g., automatically extract) a bounding box(es) and associated context word(s) (e.g., bounding boxes 506 and 508, associated with context word(s) SERVICE TAG 202; bounding boxes 510, 512, and 514, associated with context word(s) EXPRESS SERVICE CODE 204) and a candidate bounding box and associated candidate text string (e.g., bounding box 502 and associated candidate text string 1EX2A34 (206); bounding box 504 associated with candidate text string 12345678901 (208)) as a single (e.g., individual) visual image.

For example, with regard to visual image 500 and context word(s) SERVICE TAG 202, the trained neural network of or associated with the AI component 112 can extract a first visual image comprising bounding boxes 506 and 508, associated with context word(s) SERVICE TAG 202, and bounding box 502 and associated candidate text string 1EX2A34 (206); and also can extract a second visual image comprising bounding boxes 506 and 508, associated with context word(s) SERVICE TAG 202, and bounding box 504 associated with candidate text string 12345678901 (208). For each of the single images associated with a respective context word and a respective candidate text string (and respectively associated bounding boxes), the trained neural network of or associated with the AI component 112 can classify or predict (e.g., automatically classify or predict) each visual image as containing the target text string or not containing the target text string. The IMC 102 can determine which of the individual visual images (e.g., first visual image) is classified as containing or predicted to contain the target text string with regard to the context word, and the IMC 102 can determine or select the candidate text string (e.g., text string 1EX2A34 (206)), which is in the individual image classified or determined to contain the target text string, as the target text string associated with the context word(s) (e.g., SERVICE TAG 202). In certain embodiments, the trained neural network can be, can comprise, or can be based at least in part on a trained ResNet, wherein the trained neural network can be trained by applying a set of training examples relating to visual images of contexts words and text strings to the neural network.

When the IMC 102 determines, predicts, or identifies a target text string with regard to a particular context word(s), the IMC 102 can present (e.g., communicate or display) the target text string (e.g., target text string 122) and/or the associated context word(s) via the interface component 104 or can store the target text string and associated context word(s) in a data store 124 of or associated with the WIC 102. In some embodiments, the final determination, prediction, or identification of the target text string can be the prediction of the target text string made by the text recognition component 118 with regard to a candidate text string, contained in an associated bounding box, that the text recognition component 118 predicted is the target text string.

In some embodiments, the text recognition component 118 and/or AI component 112 can comprise or utilize a specialized DTR network and trained specialized DTR model that can be trained to desirably (e.g., accurately, reliably, or optimally) recognize (e.g., automatically recognize) characters (e.g., alphanumeric characters, symbols, or other types of characters) in alphanumeric text strings and other text string types that may not be available or common in typically available datasets, such as open source datasets. The trained specialized DTR network and trained specialized DTR model can be utilized, for example, in instances where a target text string contains alphanumeric characters and/or symbols, as opposed to all alphabetical characters or all numerical characters.

The IMC 102 or another component of or associated with the system 100 can train the specialized DTR network and/or train or generate (e.g., develop) the trained specialized DTR model, based at least in part on application of a set of training examples of visual images comprising context words and alphanumeric text strings and/or other text strings (e.g., text strings comprising alphabetical characters, numerical characters, and/or symbols), such that, when trained, the trained specialized DTR network and/or trained specialized DTR model can desirably (e.g., accurately, suitably, or optimally) predict or determine text strings based at least in part on the results of analyzing the text strings and/or associated candidate word(s), and the training or development of the trained specialized DTR network and/or trained specialized DTR model, in accordance with the defined information management criteria. For example, with regard to service tags, where the target text string can comprise alphanumeric characters, the IMC 102 or another component can train (e.g., desirably train or tune) the specialized DTR network and/or train or generate (e.g., develop) the trained specialized DTR model to desirably (e.g., accurately, suitably, or optimally) predict, recognize, or determine a target text string, comprising alphanumeric characters, wherein the characters of the target text string conform with or have a pattern that can be consistent with a type of text string that can be associated with context word(s) SERVICE TAG.

The set of training examples of visual images of text strings can be determined based at least in part on the type of context word(s) (e.g., anchor word(s)), the type of image, document, or information (e.g., photograph, scanned image, or electronic document; product label, invoice, purchase order, or other type of information or document), the manufacturer of the product(s) associated with the text strings, the model(s) of the product(s), the language(s) associated with the product(s), or another desired factor. The training of the specialized DTR network and/or specialized DTR model can continue to be refined over time by application of additional training examples of visual images comprising context words and alphanumeric text strings and/or other text strings to the specialized DTR network and/or specialized DTR model.

In accordance with various embodiments, the text recognition component 118 can utilize the specialized DTR network and specialized DTR model in place of or in addition to the generalized DTR network and generalized DTR model. For example, in some embodiments, prior to a bounding box prediction, the text recognition component 118 can utilize the generalized DTR network and generalized DTR model, and, at when making a bounding box prediction regarding a target text string or at a desired time thereafter when making a final prediction of a target text string, the text recognition component 118 can utilize the specialized DTR network and specialized DTR model to confirm or better predict a target text string and/or the characters of the target text string. In other embodiments, prior to a bounding box prediction, the text recognition component 118 can utilize the specialized DTR network and specialized DTR model to predict or determine a target text string and/or the characters of the target text string.

The IMC 102 can determine and assign (e.g., automatically determine, calculate, and/or assign) confidence levels to predictions of target text strings and predictions of characters of target text strings in visual images. In some embodiments, the IMC 102 can determine (e.g., calculate) a confidence level of an accuracy of a prediction that a candidate text string identified in a visual image is a target text string that can be associated with a context word (e.g., anchor word or text string) identified in the visual image based at least in part on a probability value of a probability that the candidate text string is the target text string that can be associated with the context word and a set of defined threshold probability values, wherein the probability value can be determined by the AI component 112 or other component of the IMC 102. For example, if the probability value indicates that the probability is relatively high (e.g., 0.90, 0.95, or some other relatively high probability value) and satisfies (e.g., meets or exceeds) a defined high threshold probability value of the set of defined threshold probability values, the IMC 102 can determine that the confidence level of the accuracy of the prediction of the target text string can be high and can assign a high confidence level and/or a color coding (e.g., green colored indicator or highlighting) or other coding (e.g., other visual or audio coding or indication) that can indicate that the confidence level is high with regard to the accuracy of that prediction of the target text string. If the probability value indicates that the probability is relatively mid-level (e.g., 0.50, 0.60, 0.70, or some other relatively mid-level value) and satisfies a defined medium threshold probability value, but not the defined high threshold probability value, of the set of defined threshold probability values, the IMC 102 can determine that the confidence level of the prediction of the target text string can be medium and can assign a medium confidence level and/or a color coding (e.g., yellow colored indicator or highlighting) or other coding that can indicate that the confidence level is medium with regard to the accuracy of that prediction of the target text string. If, instead, the probability value indicates that the probability is relatively low (e.g., less than 0.50) and does not satisfy (e.g., does not meet or exceed) the defined medium threshold probability value, the IMC 102 can determine that the confidence level of the prediction of the target text string can be low and can assign a low confidence level and/or a color coding (e.g., red colored indicator or highlighting) or other coding that can indicate that the confidence level is low with regard to the accuracy of that prediction of the target text string. A confidence level can be the same value as the probability value or can be a different value that can correspond to, indicate, and/or be determined based at least in part on the probability value. The interface component 104 can present the confidence level and/or associated color coding or other coding to a user in connection with presenting the prediction of the target text string or information relating thereto, and/or the IMC 102 can associate the confidence level and/or associated color coding or other coding with such prediction and can store the confidence level and/or associated color coding or other coding in the data store 124.

In certain embodiments, the IMC 102 can determine (e.g., calculate) a confidence level of a prediction of characters of a target text string identified in a visual image based at least in part on a probability value of a probability that the characters identified in the target text string are accurately identified and a set of defined threshold probability values relating to text string character prediction, wherein the probability value can be determined by the AI component 112 or other component of the IMC 102. For example, if the probability value indicates that the probability is relatively high (e.g., 0.90, 0.95, or some other relatively high probability value) and satisfies a defined high threshold probability value of the set of defined threshold probability values, the IMC 102 can determine that the confidence level of the accuracy of the prediction of the characters of the target text string can be high and can assign a high confidence level and/or a color coding (e.g., green colored indicator or highlighting) or other coding that can indicate that the confidence level is high with regard to the accuracy of that prediction of the characters of the target text string. If the probability value indicates that the probability is relatively mid-level (e.g., 0.50, 0.60, 0.70, or some other relatively mid-level value) and satisfies a defined medium threshold probability value, but not the defined high threshold probability value, of the set of defined threshold probability values, the IMC 102 can determine that the confidence level of the accuracy of the prediction of the characters of the target text string can be medium and can assign a medium confidence level and/or a color coding (e.g., yellow colored indicator or highlighting) or other coding that can indicate that the confidence level is medium with regard to the accuracy of that prediction of the characters of the target text string. If, instead, the probability value indicates that the probability is relatively low (e.g., less than 0.50) and does not satisfy the defined medium threshold probability value, the IMC 102 can determine that the confidence level of the accuracy of the prediction of the characters of the target text string can be low and can assign a low confidence level and/or a color coding (e.g., red colored indicator or highlighting) or other coding that can indicate that the confidence level is low with regard to the accuracy of that prediction of the characters of the target text string. A confidence level can be the same value as the probability value or can be a different value that can correspond to, indicate, and/or be determined based at least in part on the probability value. The interface component 104 can present the confidence level and/or associated color coding or other coding relating to the prediction of the text string characters to a user in connection with presenting the prediction of the target text string or information relating thereto, and/or the IMC 102 can associate the confidence level and/or associated color coding or other coding with such text string character prediction and can store the confidence level and/or associated color coding or other coding in the data store 124.

In some embodiments, the IMC 102 can utilize a confidence level or probability value to determine an action to perform in connection with determining or predicting target text strings and determining or predicting characters of target text strings in visual images. For instance, the IMC 102 can perform a first AI or machine learning analysis (e.g., analysis utilizing locational coordinates of bounding boxes associated with context words and candidate bounding boxes associated with candidate text strings of a visual image as input data to a desired trained neural network of or associated with the AI component 112). Based on the results of the first AI or machine learning analysis, the IMC 102 and/or AI component 112 can predict a text string of candidate text strings that can be a target text string associated with a context word, and can determine a probability value and/or associated confidence level in the prediction of the target text string. If the IMC 102 determines that the probability value and/or confidence level is sufficiently high enough to satisfy a defined threshold (e.g., high threshold) probability value and/or defined threshold (e.g., high threshold) confidence level, the IMC 102 can determine that further analysis to predict the target text string associated with the context word does not have to be performed. This can desirably reduce the use of resources (e.g., computing resources, time resources, or other resources) associated with predicting or determining a target text string that can be associated with a context word and can enable the IMC 102 to perform operations in an improved manner (e.g., in an enhanced, efficient, and/or optimal manner).

If, instead, the IMC 102 determines that the probability value and/or confidence level is not sufficiently high enough to satisfy the defined threshold (e.g., high threshold) probability value and/or defined threshold (e.g., high threshold) confidence level, the IMC 102 can determine that further analysis is to be performed to more desirably (e.g., more accurately and/or more confidently) predict the target text string associated with the context word, and the IMC 102 and/or AI component 112 can perform another analysis (e.g., a second AI or machine learning analysis) to have the trained neural network extract bounding boxes and associated context words and candidate bounding boxes and associated candidate text strings as respective single (e.g., individual) images associated with a visual image and perform an AI or machine learning analysis on such images to predict the target text string associated with the context word of interest. Such additional analysis (e.g., second AI or machine learning analysis) can improve (e.g., increase) the confidence level that the first analysis prediction that such candidate text string is the target text string is accurate (e.g., if the first analysis prediction had only a medium confidence level), if the additional analysis also predicts that such candidate text string is the target text string; or, instead, can predict that a different candidate text string is the target text string that can be associated with the context word.

As another example, the IMC 102 can utilize a rule (e.g., inline grouping rule) and/or a confidence level with respect to an inline grouping analysis to determine an action to perform in connection with determining or predicting a target text string of candidate text strings that can be associated with a context word in a visual image. For instance, there may be a situation where a candidate text string is generally along a same line as a context word, but, for one or more reasons (e.g., printing of characters was slightly misaligned), the candidate text string is not completely or perfectly in line with the context word. The IMC 102 can employ an inline grouping rule of the set of inline grouping rules that can specify that a candidate text string that is within (e.g., less than) a defined threshold (e.g., low threshold) tolerance (e.g., distance tolerance) of being in line with a context word can be deemed to be in line with the context word and/or, accordingly, there can be a high confidence level that the candidate text string is in line with the context word. If, instead, based on the inline grouping analysis, the IMC 102 (e.g., inline grouper component 120) determines that the candidate text string is not within the defined threshold (e.g., low threshold) tolerance of being in line with the context word, the candidate text string can be deemed to not be in line with the context word and/or, accordingly, there can be a lower (e.g., medium or low) confidence level that the candidate text string is in line with the context word (e.g., a candidate text string does not satisfy the defined (e.g., low) threshold tolerance, but satisfies a defined medium threshold tolerance, and accordingly the IMC 102 can determine that there is a medium confidence level that the candidate text string is in line with the context word; or a candidate text string does not satisfy the defined (e.g., low) threshold tolerance or the defined medium threshold tolerance, and accordingly the IMC 102 can determine that there is a low confidence level that the candidate text string is in line with the context word). The defined low threshold tolerance can have a lower tolerance level (e.g., lower distance tolerance) with regard to alignment (e.g., to the amount of misalignment) of a candidate text string with a context word than the defined medium threshold tolerance.

The IMC 102 can utilize the inline grouping rule relating to inline tolerance and/or confidence level relating to inline tolerance to determine or facilitate determining whether a determined or predicted text string of the candidate text strings of a visual image is the target text string that is in line with and can be associated with the context word. For example, if the IMC 102 determines that a candidate text string satisfies the inline grouping rule relating to tolerance (e.g., satisfies the defined low threshold tolerance) and/or correspondingly has a high confidence level of being in line with the context word (e.g., based on satisfying the inline grouping rule relating to defined low threshold tolerance), and is determined or predicted to be the target text string associated with the context word, the IMC 102 can determine that an AI or machine learning analysis does not have to be performed to determine or predict the target text string associated with the context word. This can desirably reduce the use of resources (e.g., computing resources, time resources, or other resources) associated with determining a target text string and enable the IMC 102 to perform operations in an improved manner (e.g., in an enhanced, efficient, and/or optimal manner).

If, instead, the IMC 102 determines that a candidate text string does not satisfy the inline grouping rule relating to tolerance (e.g., does not satisfy the defined low threshold tolerance indicated in the rule) and/or has a lower (e.g., medium) confidence level of being in line with the context word (e.g., based on not satisfying the inline grouping rule with regard to defined low threshold tolerance, but satisfying the inline grouping rule with regard to the defined medium threshold tolerance), but is still determined or predicted to be the target text string associated with the context word relative to the other candidate text strings (e.g., due in part to such candidate text string being determined to satisfy the defined medium threshold tolerance), the IMC 102 can determine that the inline grouping rules are not sufficiently satisfied and/or the confidence level that such candidate text string is the target text string is not sufficiently high enough, and accordingly can determine that an AI or machine learning analysis is to be performed to determine or predict the target text string associated with the context word. Such additional analysis (e.g., AI or machine learning analysis) can improve (e.g., increase) the confidence level that the determination or prediction that such candidate text string is the target text string is accurate, if the additional analysis also predicts that such candidate text string is the target text string; or, instead, can predict that a different candidate text string is the target text string that can be associated with the context word.

The IMC 102 also can perform a similar analysis to determine whether the prediction of characters of a target text string associated with a context word(s) in a visual image obtained from a first AI or machine learning analysis (e.g., generalized DTR analysis) has a probability value and/or confidence level that is sufficiently high enough to satisfy a defined threshold (e.g., high threshold) probability value and/or defined threshold (e.g., high threshold) confidence level. If the IMC 102 determines that the defined threshold probability value and/or defined threshold confidence level has been satisfied (e.g., met or exceeded), the IMC 102 can determine that further analysis (e.g., a second AI or machine learning analysis, such as a specialized DTR analysis) to predict the characters of the target text string associated with the context word(s) does not have to be performed. This can desirably reduce the use of resources (e.g., computing resources, time resources, or other resources) associated with predicting or determining a target text string that can be associated with a context word and can enable the IMC 102 to perform operations in an improved manner (e.g., in an enhanced, efficient, and/or optimal manner).

If, instead, the IMC 102 determines that the probability value and/or confidence level is not sufficiently high enough to satisfy the defined threshold (e.g., high threshold) probability value and/or defined threshold (e.g., high threshold) confidence level, the IMC 102 can determine that further analysis is to be performed to more desirably (e.g., more accurately and/or more confidently) predict the characters of the target text string, and the IMC 102 and/or AI component 112 can perform another analysis (e.g., a second AI or machine learning analysis, such as a specialized DTR analysis) to have the trained neural network predict the characters of the target text string associated with the context word(s). Such additional analysis (e.g., second AI or machine learning analysis, such as the specialized DTR analysis) can improve (e.g., increase) the confidence level that the first analysis prediction of the characters of the target text string is accurate (e.g., if the first analysis prediction had only a medium confidence level), if the additional analysis also predicts the same characters of the target text string; or, instead, can predict that a different group of characters of the target text string.

With regard to each context word(s) and associated desired (e.g., target) text string identified in the visual image (e.g., visual image 106, 200, or 500), the IMC 102, via the interface component 104, can present the desired text string and associated context word(s) via an interface (e.g., a display screen) and/or can store the desired text string and associated context word(s) in the data store 124. The desired text string and associated context word(s) can be in an editable format, which can allow a user, using a desired interface and tools (e.g., keyboard, mouse, touch display screen, and/or other controls or buttons), to edit or manipulate the individual characters of the desired text string and/or context word(s).

The disclosed subject matter, by employing the IMC 102, including the AI component 112 (e.g., trained AI component) and associated trained neural networks and/or other type of trained AI or machine learning networks, and employing the techniques, processes, and algorithms, such as described herein, can desirably (e.g., accurately, suitably, efficiently, and/or optimally) determine or predict a target text string associated with a context word(s) (e.g., anchor word(s) or anchor text string), and can determine or predict characters of a target text string that can be associated with a context word(s), in a visual image, in an improved manner, as compared to traditional techniques for determining or predicting text strings in a visual image and determining characters of a text string contained in the visual image. The disclosed subject matter also can desirably (e.g., accurately, suitably, efficiently, and/or optimally) determine or predict a target text string associated with a context word(s), and can determine or predict characters of a target text string that can be associated with a context word(s), in a visual image, even if the image type (e.g., type of photograph, angle of object in the photograph) and/or text string type or format have not been seen or analyzed before by the IMC 102, and/or even if the image quality of the visual image is relatively low quality, as opposed to being a high quality PDF image or document. In this manner, the disclosed subject matter is thus also an improvement over traditional techniques for determining or predicting text strings in a visual image and determining characters of a text string contained in the visual image.

In some embodiments, the IMC 102 also can comprise an operations manager component 126 that can control (e.g., manage) operations associated with the IMC 102. For example, the operations manager component 126 can facilitate generating instructions to have components of the IMC 102 perform operations, and can communicate respective instructions to respective components (e.g., interface component 104, context component 108, orientation component 110, AI component 112, text detection component 114, bounding box component 116, text recognition component 118, inline grouper component 120, data store 124, and processor component 128) of the IMC 102 to facilitate performance of operations by the respective components of the IMC 102 based at least in part on the instructions, in accordance with the defined information management criteria and information management algorithm(s) (e.g., information management algorithms as disclosed, defined, recited, or indicated herein by the methods, systems, and techniques described herein). The operations manager component 126 also can facilitate controlling data flow between the respective components of the IMC 102 and controlling data flow between the IMC 102 and another component(s) or device(s) (e.g., communication or client device, capture component (e.g., scanner component, camera, or other type of capture component), a display component or device, an AI, machine learning, or neural network component or device, or other type of component or device) associated with (e.g., connected to) the IMC 102.

The processor component 128 can work in conjunction with the other components (e.g., interface component 104, context component 108, orientation component 110, AI component 112, text detection component 114, bounding box component 116, text recognition component 118, inline grouper component 120, data store 124, and operations manager component 126) to facilitate performing the various functions of the IMC 102. The processor component 128 can employ one or more processors, microprocessors, or controllers that can process data, such as information relating to visual images, text information (e.g., text strings), context words (e.g., context text strings), orientation of visual images, bounding boxes, text detection, text recognition, models (e.g., neural network or DTR models), rules (e.g., inline grouping rules), artificial intelligence, machine learning, metadata, parameters, traffic flows, policies, defined information management criteria, algorithms (e.g., information management algorithms, training algorithms, and/or other algorithms), protocols, interfaces, tools, and/or other information, to facilitate operation of the DMC 402, as more fully disclosed herein, and control data flow between the DMC 402 and other components (e.g., memory component, write component, read component, file system, or other component) associated with the DMC 402.

The data store 124 can store data structures (e.g., user data, metadata), code structure(s) (e.g., modules, objects, hashes, classes, procedures) or instructions, information relating to visual images, text information (e.g., text strings), context words (e.g., context text strings), orientation of visual images, bounding boxes, text detection, text recognition, models (e.g., neural network or DTR models), rules (e.g., inline grouping rules), artificial intelligence, machine learning, metadata, parameters, traffic flows, policies, defined information management criteria, algorithms (e.g., information management algorithms, training algorithms, and/or other algorithms), protocols, interfaces, tools, and/or other information, to facilitate controlling operations associated with the IMC 102. In an aspect, the processor component 128 can be functionally coupled (e.g., through a memory bus) to the data store 124 in order to store and retrieve information desired to operate and/or confer functionality, at least in part, to the interface component 104, context component 108, orientation component 110, AI component 112, text detection component 114, bounding box component 116, text recognition component 118, inline grouper component 120, data store 124, operations manager component 126, processor component 128, or other component, and/or substantially any other operational aspects of the IMC 102.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
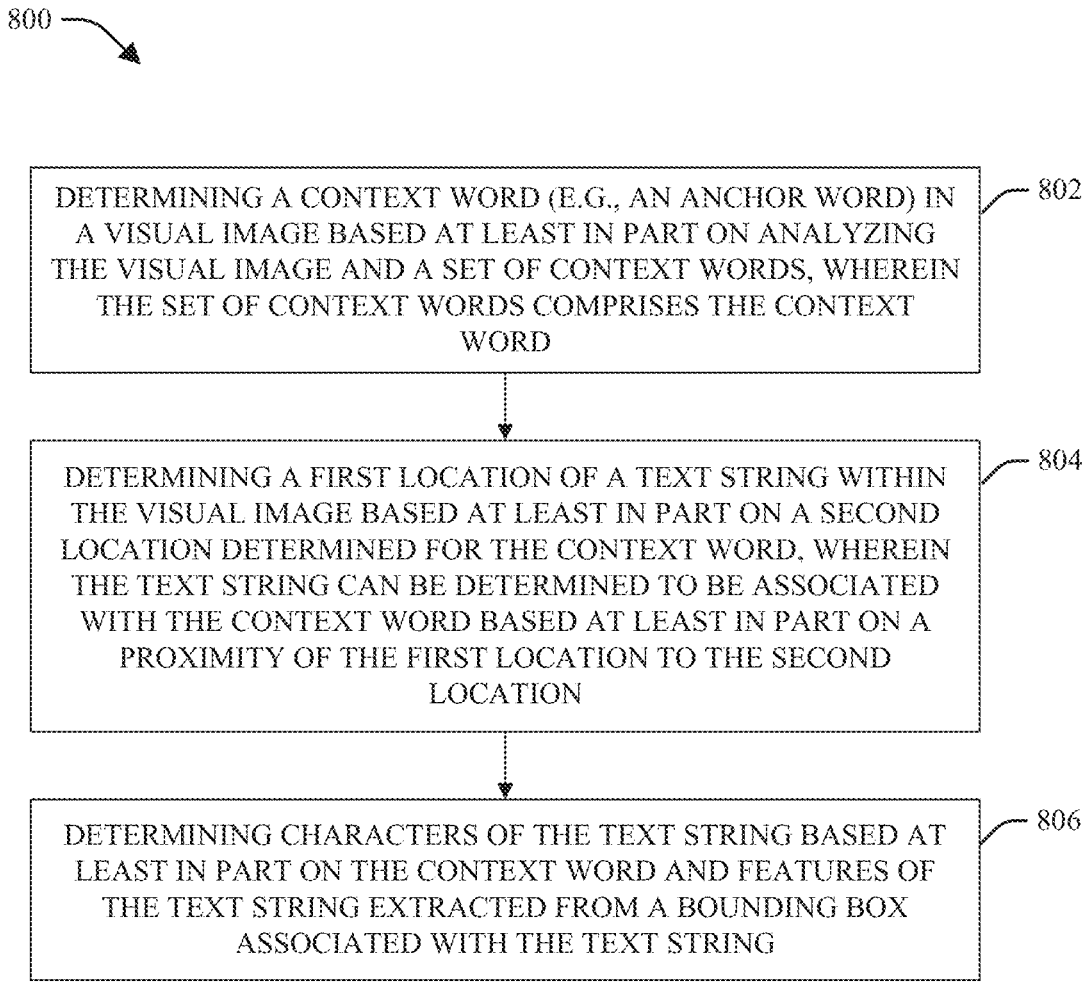
FIG. 8 illustrates a flow chart of an example method that can determine (e.g., automatically determine) a desired (e.g., target) text string and associated context word in a visual image, in accordance with various aspects and embodiments of the disclosed subject matter.
Figure 9:
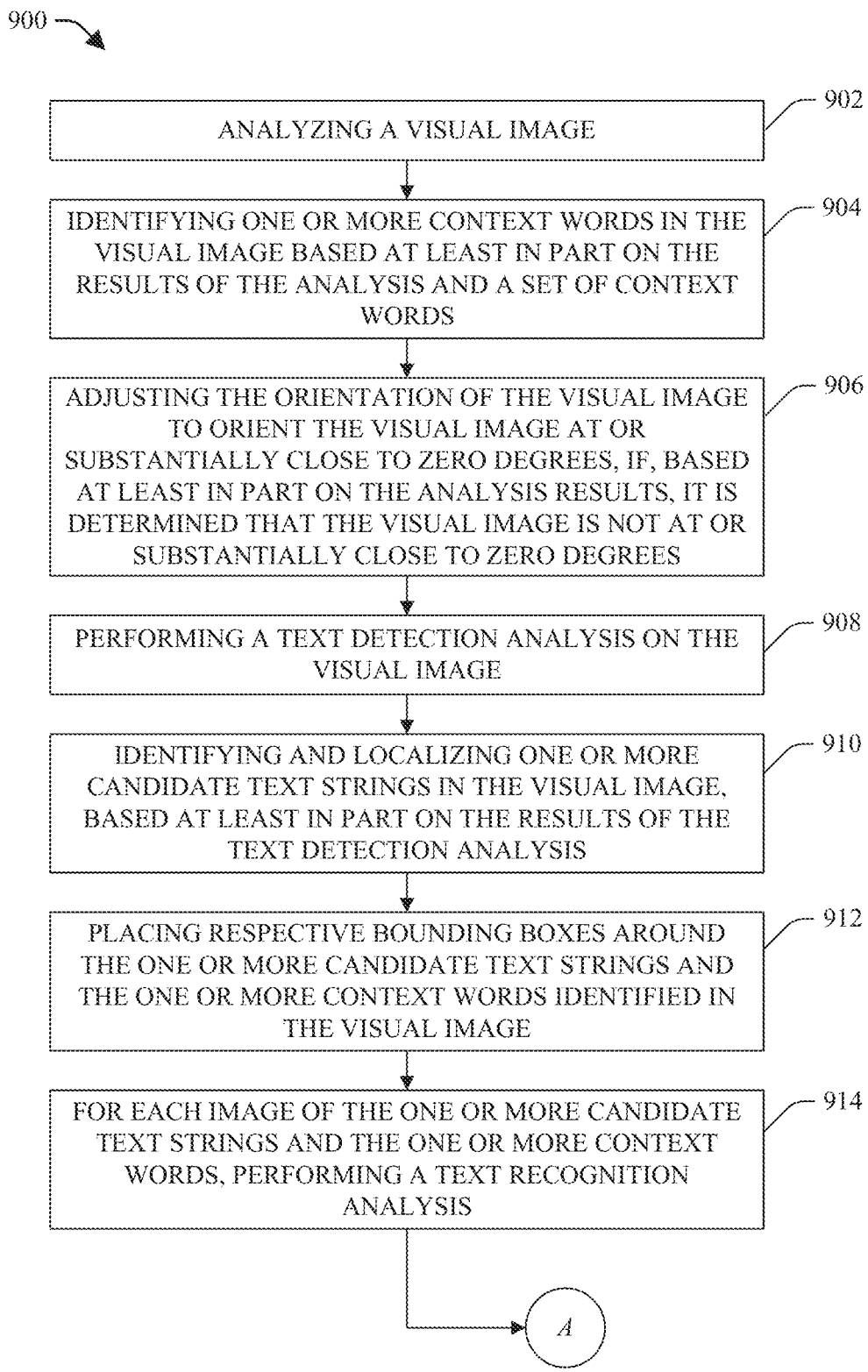
FIGS. 9 and 10 present a flow chart of another example method that can determine (e.g., automatically determine) a desired (e.g., target) text string and associated context word in a visual image, in accordance with various aspects and embodiments of the disclosed subject matter.
Figure 10:
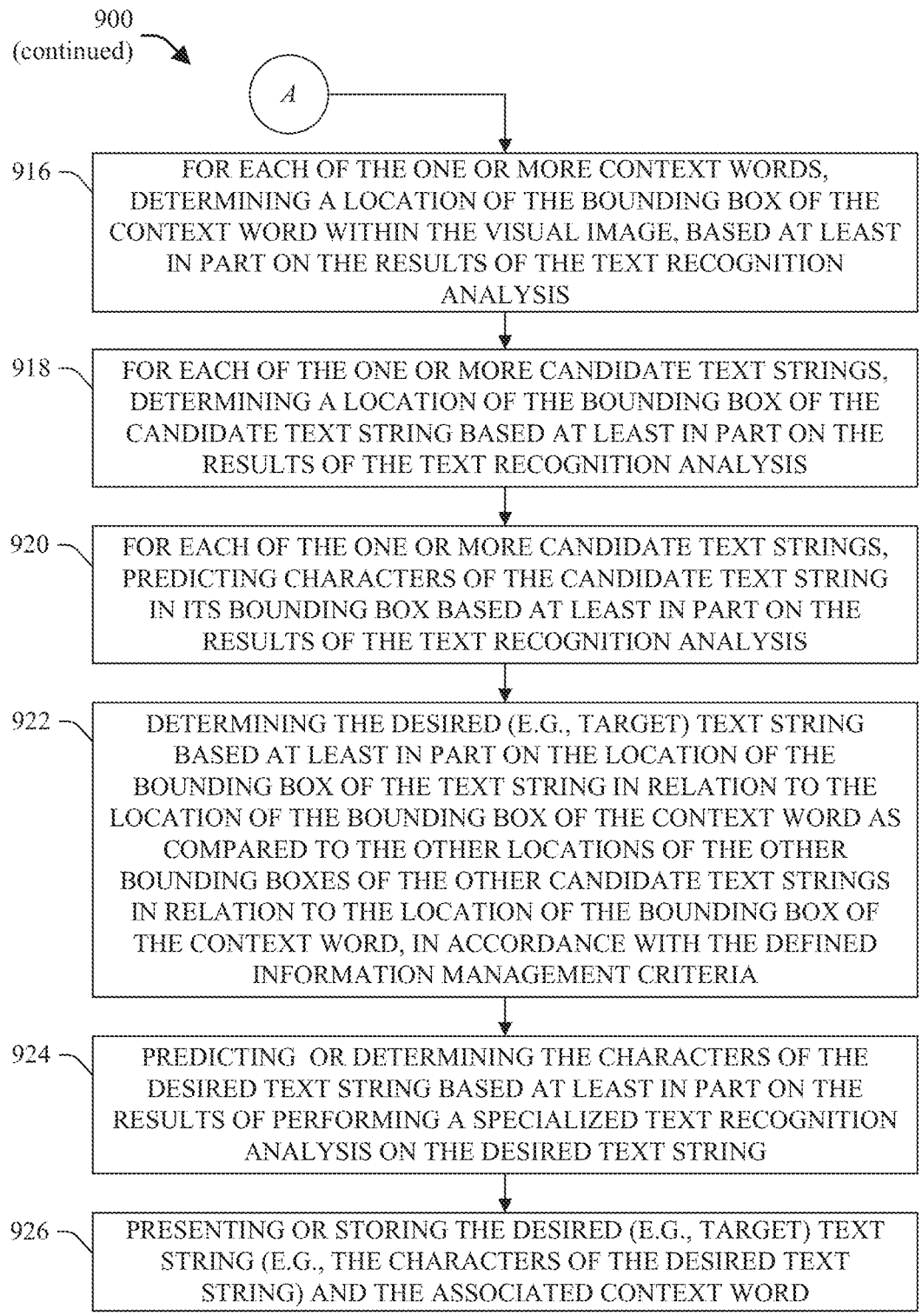

In view of the example systems and/or devices described herein, example methods that can be implemented in accordance with the disclosed subject matter can be further appreciated with reference to flowcharts in FIGS. 8-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 that can determine (e.g., automatically determine) a desired (e.g., target) text string and associated context word (e.g., anchor word or anchor text string) in a visual image, in accordance with various aspects and embodiments of the disclosed subject matter. The method 800 can be employed by, for example, a system comprising the IMC, a processor component (e.g., of or associated with the IMC), and/or data store (e.g., of or associated with the IMC and/or the processor component).

At 802, a context word (e.g., an anchor word) can be determined in a visual image based at least in part on analyzing the visual image and a set of context words, wherein the set of context words comprises the context word. The IMC can analyze the visual image to facilitate identifying or determining the context word in the visual image. There can be more than one context word in a visual image, and the IMC can identify or determine each of the one or more context words in the visual image. The IMC can reference the set of context words (e.g., set of anchor words or anchor text strings) to determine whether any word or string identified in the visual image satisfies a defined match criterion (e.g., matches or substantially matches) with regard to a context word in the set of context words. Based at least in part on the results of the analysis, the IMC can determine a context word in the visual image satisfies the defined match criterion with regard to a corresponding (e.g., matching or substantially matching) context word in the set of context words.

At 804, a first location of a text string within the visual image can be determined based at least in part on a second location determined for the context word, wherein the text string can be determined to be associated with the context word based at least in part on a proximity of the first location to the second location. At 806, characters of the text string can be determined based at least in part on the context word and features of the text string extracted from a bounding box associated with the text string.

In some embodiments, the IMC can determine whether the orientation of the visual image is at or near zero degrees, and if not, the IMC can adjust the orientation of the visual image so that the visual image can be at or substantially close to zero degrees, as more fully described herein. In certain embodiments, the IMC can perform text detection analysis (e.g., CRAFT analysis) on the visual image using a trained neural network. Based at least in part on the results of the text detection analysis, the IMC can identify candidate text strings, including the text string, in the visual image. The IMC can apply bounding boxes to the candidate text strings and the context word.

In certain embodiments, the IMC can perform a DTR analysis (e.g., generalized DTR analysis) on the visual image. As part of the DTR analysis, the IMC can transform respective images of respective candidate text strings in their respective bounding boxes to normalize the respective images of respective candidate text strings. The IMC also can extract respective features (e.g., textual features and/or contextual features) from the respective images (e.g., normalized images) of the respective candidate text strings, and perform sequence modeling to sequence model the respective features of the respective images of the respective candidate text strings. The IMC can predict the respective characters of the respective candidate text strings based at least in part on the sequence modeling.

The IMC also can determine the location (e.g., second location) of the context word in the visual image. Based at least in part on the location of the context word in the visual image, the IMC identify or determine the text string, and the location (e.g., first location) of the text string (e.g., location of the bounding box of the text string), in the visual image, as well as the respective locations of the other candidate text strings in the visual image. The IMC can identify or determine the text string (e.g., bounding box of the text string) that is located in proximity to context word (e.g., bounding box of the context word), and/or the IMC can employ inline grouping to identify or determine the text string that satisfies a defined inline grouping criterion with regard to the context word relative to other candidate text strings identified in the visual image. For example, when applying inline grouping, the IMC can determine the text string that is in line, or at least most in line, and/or is in closest proximity, to the context word in the horizontal direction or vertical direction, as compared to the other candidate text strings in the visual imager, in accordance with the defined inline grouping criterion, as more fully described herein.

In some embodiments, in addition to or as an alternative to using inline grouping, the IMC can employ artificial intelligence or machine learning (e.g., using the trained neural network) to facilitate determining the text string that is to be associated with the context word relative to other candidate text strings identified in the visual image. In certain embodiments, the IMC, using the trained neural network, also can perform a specialized DTR analysis on the text string, and based at least in part on the results of such specialized DTR analysis, the IMC can determine the characters of the text string based at least in part on the context word and features of the text string extracted from the bounding box associated with the text string. For example, if the text string contains alphanumeric characters, it can or may be desirable to perform the specialized DTR analysis on the text string to facilitate accurately identifying or determining the alphanumeric characters of the text string.

FIGS. 9 and 10 present a flow chart of another example method 900 that can determine (e.g., automatically determine) a desired (e.g., target) text string and associated context word (e.g., anchor word or anchor text string) in a visual image, in accordance with various aspects and embodiments of the disclosed subject matter. The method 900 can be employed by, for example, a system comprising the IMC, a processor component (e.g., of or associated with the IMC), and/or data store (e.g., of or associated with the IMC and/or the processor component).

At 902, a visual image can be analyzed. The IMC can analyze the visual image to facilitate identifying one or more context words (e.g., anchor words or anchor text strings) in the visual image and/or determining whether an orientation of the visual image is to be adjusted.

At 904, one or more context words can be identified in the visual image based at least in part on the results of the analysis and a set of context words. As part of the analysis, the IMC can reference the set of context words to determine whether any text string identified in the visual image satisfies a defined match criterion (e.g., matches or substantially matches) with regard to a context word in the set of context words. Based at least in part on the results of the analysis, the IMC can determine that a context word(s) in the visual image satisfies the defined match criterion with regard to a corresponding (e.g., matching or substantially matching) context word(s) in the set of context words.

At 906, the orientation of the visual image can be adjusted to orient the visual image at or substantially close to zero degrees, if, based at least in part on the analysis results, it is determined that the visual image is not at or substantially close to zero degrees. Based at least in part on the analysis results, the IMC can determine whether the orientation of the visual image (e.g., orientation of the context word(s) or other text string in the visual image) is at zero degrees or at least substantially close to zero degrees relative to a zero degree reference line. If the IMC determines that the orientation of the visual image is at or substantially close to zero degrees, the IMC can determine that no adjustment of the visual image is to be performed. If the IMC determines that the orientation of the visual image is not at or substantially close to zero degrees, the IMC can adjust the orientation of the visual image to orient the visual image (e.g., orient the context word(s) or other text string in the visual image) at zero degrees or at least substantially close to zero degrees relative to the zero degree reference line. In some embodiments, the IMC can employ a trained neural network to determine the orientation of the visual image, determine whether the visual image is to be adjusted, and/or determine an adjustment (if any) to make to the visual image to orient the visual image at or substantially close to zero degrees.

At 908, a text detection analysis can be performed on the visual image. At 910, one or more candidate text strings in the visual image can be identified and localized, based at least in part on the results of the text detection analysis. The IMC, employing a trained neural network (e.g., a trained convolutional neural network), can perform the text detection analysis (e.g., CRAFT analysis) on the visual image. Based at least in part on the results of the text detection analysis, the IMC can identify, determine, and/or localize one or more candidate text strings (e.g., individual words, numbers, or other text strings) in the visual image, as more fully described herein. In some embodiments, based at least in part on the results of the text detection analysis, the IMC can identify and localize one or more groupings of characters (e.g., alphabetical, numerical, or alphanumeric characters) in the visual image, wherein a grouping of characters can be characters that can be in relatively close proximity to (e.g., within a defined distance of) each other to form a candidate text string. The text detection analysis may not necessarily identify the particular characters of a grouping of characters, although, in certain embodiments, as part of the text detection analysis, the IMC can determine or identify (e.g., can make an initial or preliminary determination or identification of) the particular characters of the grouping of characters.

At 912, respective bounding boxes can be placed around the one or more candidate text strings and the one or more context words identified in the visual image. The IMC can place (e.g., form) the respective bounding boxes around the one or more candidate text strings and the one or more context words identified in the visual image. Respective images of the one or more respective candidate text strings and the one or more respective context words in the respective bounding boxes can be provided as an output for further analysis.

At 914, for each image of the one or more candidate text strings and the one or more context words, a text recognition analysis can be performed. The IMC, employing a trained neural network (e.g., a trained DTR network) can perform a text recognition analysis, such as, for example, DTR analysis (e.g., generalized DTR analysis), on each image of the one or more candidate text strings and the one or more context words. At this point, the method 900 can proceed to reference point A, wherein the method 900 can continue from reference point A, as depicted in FIG. 10.

At 916, for each of the one or more context words, a location of the bounding box of the context word within the visual image can be determined, based at least in part on the results of the text recognition analysis. At 918, for each of the one or more candidate text strings, a location of the bounding box of the candidate text string can be determined based at least in part on the results of the text recognition analysis. At 920, for each of the one or more candidate text strings, characters of the candidate text string in its bounding box can be predicted based at least in part on the results of the text recognition analysis. Based at least in part on the results of the text recognition analysis performed by the IMC, employing the trained neural network (e.g., a trained DTR network) on the respective images of the one or more candidate text strings and the one or more context words, the WIC can determine the location of each bounding box of each context word of the one or more context words within the visual image, can determine the location of each bounding box of each candidate text string of the one or more candidate text strings within the visual image, and can predict the characters of each candidate text string in its bounding box for the one or more candidate text strings, as more fully described herein.

At 922, the desired (e.g., target) text string can be determined based at least in part on the location of the bounding box of the text string in relation to the location of the bounding box of the context word as compared to the other locations of the other bounding boxes of the other candidate text strings in relation to the location of the bounding box of the context word, in accordance with the defined information management criteria. In some embodiments, the IMC can employ a rules-based techniques, including employing inline grouping and text string size checking, to facilitate determining the desired text string from the set of candidate text strings. For instance, the IMC can determine one or more (e.g., a subset of) candidate text strings of the set of candidate text strings that are in line (e.g., aligned) or substantially in line with the context word in a horizontal direction or vertical direction, in accordance with an inline grouping rule of the set of inline grouping rules, wherein the defined information management criteria can comprise, specify, or define the set of inline grouping rules. From those one or more candidate text strings, the IMC also can determine one or more candidate text strings that have a text string size and/or other formatting (e.g., a number of characters, and/or type or arrangement of characters) that conform to the text string size and/or other formatting associated with the context word (e.g., if the context word is serial number, the text string should have the number and type of characters that conform to the number and type of characters used for serial numbers), in accordance with another inline grouping rule of the set of inline grouping rules. From the remaining one or more candidate text strings that satisfy the inline grouping criteria and the text string size criteria, if there is still more than one candidate text string under consideration, the IMC can determine the desired text string based at least in part on the location of the bounding box of the text string in relation to the bounding box of the context word as compared to the other locations of the other bounding boxes of the other candidate text strings in relation to the bounding box of the context word, in accordance with still another inline grouping rule of the set of inline grouping rules. For instance, the IMC can determine which candidate text string of the remaining candidate text strings is closest in distance to the context word.

In certain embodiments, as an alternative to, or in addition to employing the rules-based techniques (e.g., if more than one candidate text string remains after applying the rules-based techniques), the IMC can apply one or more artificial intelligence or machine learning techniques, using the trained neural network, to facilitate determining the desired text string from the set of candidate text strings. For instance, the IMC, utilizing the trained neural network, can determine the desired based at least in part on the location (e.g., location coordinates) of the bounding box of the text string in relation to the location (e.g., location coordinates) of the bounding box of the context word as compared to the other locations (e.g., other location coordinates) of the other bounding boxes of the other candidate text strings in relation to the location of the bounding box of the context word, in accordance with the defined text determination criteria. As another example, using a different machine learning approach, the IMC can have the trained neural network extract bounding box of the context word and the respective bounding boxes of the candidate text strings as respective single images, each image comprising the context word and a candidate text string. The trained neural network can analyze and classify each image as to whether or not such image contains the desired text string, and can predict or determine the image that contains the desired text string as a result of the classification of the images.

At 924, the characters of the desired text string can be predicted or determined based at least in part on the results of performing a specialized text recognition analysis on the desired text string. In some embodiments, the IMC, employing the trained neural network (e.g., trained DTR network), can perform a specialized text recognition analysis, such as, for example, a specialized DTR analysis on the image of the desired text string. The specialized DTR analysis can be performed, for example, when the text string has or potentially comprises alphanumeric characters. Based at least in part on the results of performing the specialized text recognition analysis on the desired text string, the trained DTR network can predict or determine, and the IMC can determine (e.g., from the prediction or determination of the trained DTR network), the characters of the desired text string.

At 926, the desired (e.g., target) text string (e.g., the characters of the desired text string) and the associated context word can be presented or stored. For each context word and associated desired (e.g., target) text string identified in the visual image, the IMC can present the desired text string and associated context word via an interface (e.g., a display screen) and/or can store the desired text string and associated context word in the data store. The desired text string and associated context word can be in an editable format, which can allow a user, using a desired interface and tools (e.g., keyboard, mouse, touch display screen, and/or other controls or buttons), to edit or manipulate the individual characters of the desired text string and/or context word.

Figure 11:
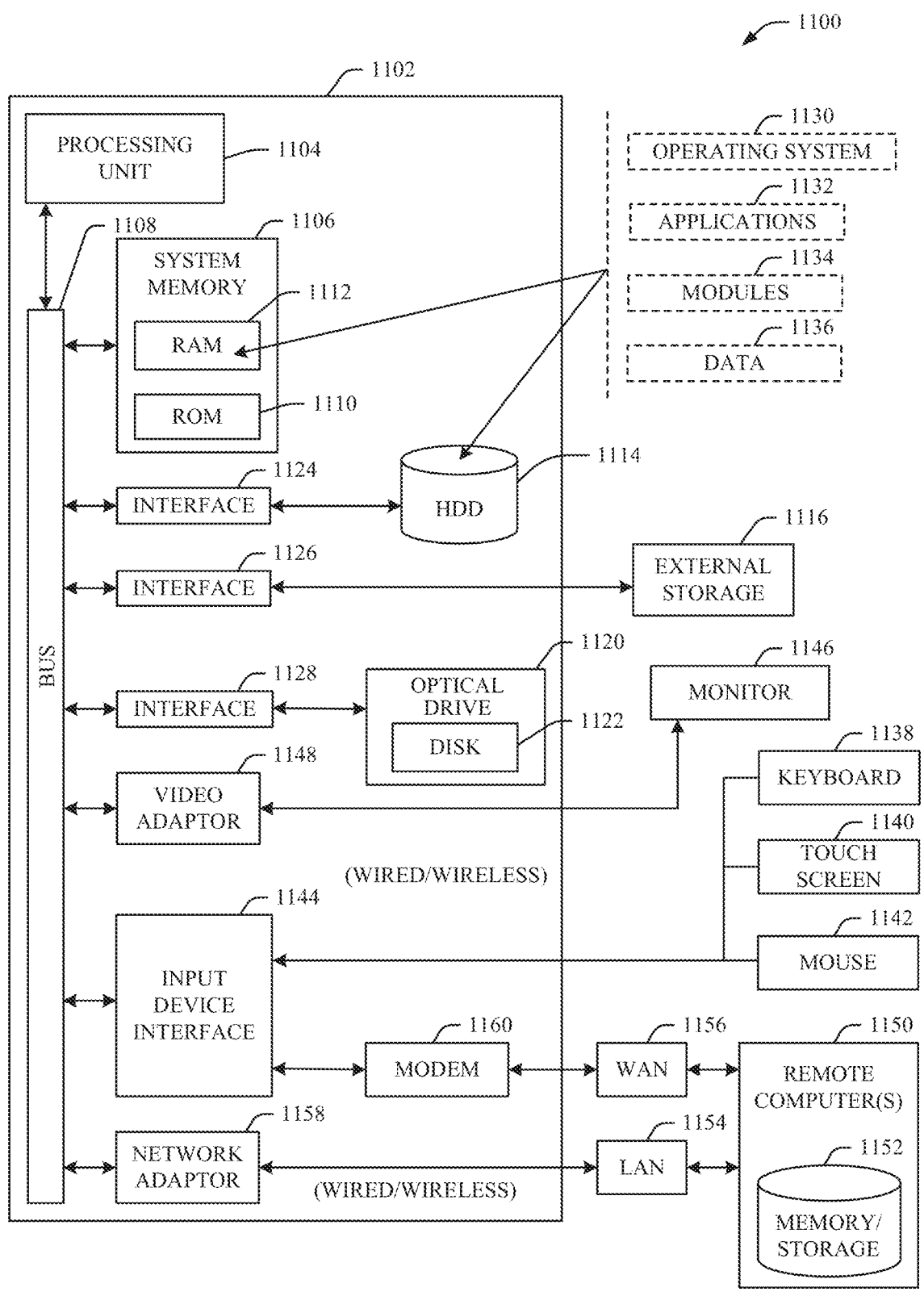
FIG. 11 illustrates an example block diagram of an example computing environment in which the various embodiments of the embodiments described herein can be implemented.

In order to provide additional context for various embodiments described herein, FIG. 11 and the following discussion are intended to provide a brief, general description of a suitable computing environment 1100 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156, e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., IMC, AI component, neural network, orientation component, text detection component, text recognition component, bounding box component, inline grouper component, data store, processor component, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   determining, by a system comprising a processor, an anchor word in a visual image based at least in part on analyzing the visual image and a group of anchor words, wherein the group of anchor words comprises the anchor word;
   determining, by the system, a first location of a text string within the visual image based at least in part on a second location determined for the anchor word;
   extracting, by the system, from the visual image, respective visual image portions that comprise respective bounding boxes containing respective candidate text strings and an anchor bounding box determined to comprise the anchor word, wherein the respective candidate text strings are determined to be potential candidates for being the text string associated with the anchor word, wherein the respective visual image portions comprise a first visual image portion comprising a first bounding box containing a first candidate text string and the anchor bounding box containing the anchor word, and depicting a first relationship between the first candidate text string and the anchor word, and a second visual image portion comprising a second bounding box containing a second candidate text string and the anchor bounding box containing the anchor word, and depicting a second relationship between the second candidate text string and the anchor word;

predicting, by a trained neural network of the system, that the first candidate text string is the text string that is associated with the anchor word based at least in part on a neural network analysis of the respective visual image portions that comprise the respective bounding boxes containing the respective candidate text strings and the anchor bounding box determined to comprise the anchor word, the first relationship, and the second relationship; and determining, by the system, alphanumeric characters of the text string based at least in part on the anchor word and features of the text string extracted from the first bounding box associated with the text string, wherein the text string is determined to be associated with the anchor word based at least in part on the predicting and a proximity of the first location to the second location and based at least in part on the alphanumeric characters of the text string being determined to conform to a target text string format that indicates the text string is a target text string related to the anchor word, and wherein the target text string format indicates whether the alphanumeric characters are to comprise alphabetical characters and whether the alphanumeric characters are to comprise numerical characters.

2. The method of claim 1, wherein the text string is an alphanumeric text string comprising the alphanumeric characters.

3. The method of claim 1, further comprising:
determining, by the system, whether an orientation of the visual image is at an angle other than zero degrees based at least in part on an orientation analysis of a text orientation of at least one of the anchor word or the text string relative to an orientation line associated with the zero degrees;
determining, by the system, that the orientation of the visual image is at the angle other than the zero degrees based at least in part on the text orientation relative to the orientation line associated with the zero degrees indicating that the orientation of the visual image is at the angle other than the zero degrees; and
in response to determining that the orientation of the visual image is at the angle other than the zero degrees, adjusting, by the system, the orientation of the visual image to re-orient the text orientation of at least one of the anchor word or the text string to align or substantially align at least one of the anchor word or the text string with the orientation line associated with the zero degrees.

4. The method of claim 1, further comprising:
performing, by the system, a text detection analysis on the visual image using a trained neural network;
identifying, by the system, candidate text strings in the visual image based at least in part on the text detection analysis, wherein the candidate text strings comprise the text string;
applying, by the system, the anchor bounding box to the anchor word and bounding boxes to the candidate text strings, wherein the bounding boxes comprise the first bounding box applied to the text string; and
providing, by the system, an anchor word image of the anchor word in the anchor bounding box and individual text string images of the candidate text strings in the bounding boxes as an output.

5. The method of claim 1, further comprising:
transforming, by the system, respective individual text string images of respective candidate text strings in respective bounding boxes to generate respective normalized individual text string images of the respective candidate text strings in the respective bounding boxes, wherein the respective candidate text strings in the respective bounding boxes comprise the text string in the first bounding box;
extracting, by the system, respective features from the respective normalized individual text string images;
sequence modeling, by the system, the respective features of the respective normalized individual text string images; and
predicting, by the system, respective alphanumeric characters of the respective candidate text strings of the respective normalized individual text string images based at least in part on the sequence modeling, wherein the respective alphanumeric characters of the respective candidate text strings comprise the alphanumeric characters of the text string.

6. The method of claim 5, further comprising:
determining, by the system, respective locations of the respective bounding boxes of the respective candidate text strings within the visual image in relation to the second location of the anchor bounding box of the anchor word, wherein the respective locations comprise the first location of a first bounding box of the text string within the visual image; and
performing, by the system, a bounding box prediction to predict that the first bounding box of the text string is a bounding box of interest that contains the text string that is the target text string based at least in part on the first location of the first bounding box of the text string within the visual image relative to the second location of the anchor bounding box of the anchor word as compared to other locations of other candidate text strings within the visual image relative to the second location of the anchor bounding box of the anchor word.

7. The method of claim 6, further comprising:
performing, by the system, inline grouping of the respective bounding boxes of the respective candidate text strings with respect to the second location of the anchor bounding box of the anchor word; and
determining, by the system, a subgroup of the respective bounding boxes of the respective candidate text strings that are in line with the anchor bounding box of the anchor word within the visual image, wherein the subgroup comprises the first bounding box of the text string.

8. The method of claim 7, wherein the anchor bounding box of the anchor word and the first bounding box of the text string are in line with each other in a horizontal direction or in a vertical direction.

9. The method of claim 7, further comprising:
based at least in part on a result of analyzing the alphanumeric characters of the text string, determining, by the system, that the alphanumeric characters of the text string, as predicted based at least in part on the predicting of the respective alphanumeric characters of the respective candidate text strings of the respective normalized individual text string images, conform to a defined text string criterion associated with the anchor word, wherein the defined text string criterion relates to the target text string format; and
determining, by the system, that the first bounding box of the text string is the bounding box of interest that contains the text string based at least in part on the determining that the alphanumeric characters of the text string conform to the defined text string criterion associated with the anchor word and based at least in part on the first location of the first bounding box of the text string in relation to the second location of the anchor bounding box of the anchor word as compared to the other locations of other bounding boxes of the other candidate text strings of the subgroup relative to the second location of the anchor bounding box of the anchor word.

10. The method of claim 9, further comprising:
inputting, by the system, the respective locations of the respective bounding boxes of the respective candidate text strings and the second location of the anchor bounding box of the anchor word to a trained neural network;
determining, by the system, respective probability values that indicate respective probabilities that the respective candidate text strings are the text string, based at least in part on a neural network analysis, by the trained neural network, of the respective locations of the respective bounding boxes of the respective candidate text strings in relation to the second location of the anchor bounding box of the anchor word; and
determining, by the system, that the text string is associated with the anchor word based at least in part on the text string being determined to have a highest probability value of being target text string as compared to other probability values associated with other candidate text strings of the respective candidate text strings, wherein the respective probability values comprise the highest probability value and the other probability values.

11. The method of claim 9, further comprising:
inputting, by the system, the visual image to the trained neural network, wherein the trained neural network is trained to recognize or determine a relative position of the anchor bounding box containing the anchor word with respect to the respective candidate bounding boxes containing respective candidate text strings based at least in part on application of a group of training examples of visual images comprising anchor words and text strings to the trained neural network, wherein the training of the trained neural network enables the trained neural network to perform the extracting and the predicting, and to determine the first relationship between the first candidate text string and the anchor word and the second relationship between the second candidate text string and the anchor word.

12. The method of claim 9, further comprising:
training, by the system, a neural network to identify the respective candidate text strings in the visual image, predict the alphanumeric characters of the text string, predict the first bounding box is the bounding box of interest that contains the text string that is the target text string, predict that the text string is associated with the anchor word, or determine respective probability values that the respective candidate text strings are the text string, based at least in part on a group of training example visual images comprising information relating to text strings and anchor words, to create the trained neural network; and
performing, by the trained neural network the system, the neural network analysis on information relating to the visual image to facilitate identifying the respective candidate text strings in the visual image, predicting the alphanumeric characters of the text string, predicting the first bounding box is the bounding box of interest that contains the text string that is the target text string, predicting that the text string is associated with the anchor word, or determining respective probability values that the respective candidate text strings are the text string.

13. The method of claim 12, wherein the training of the neural network comprises training the neural network to determine or predict characters of text strings based at least in part on the group of training example visual images, wherein at least a subgroup of the group of training example visual images comprises information relating to the determining or the predicting of the characters, and wherein the characters comprise the alphanumeric characters.

14. The method of claim 1, further comprising:
presenting, by the system, at least one of the anchor word or the text string in an editable format.

15. A system, comprising:
a memory that stores computer executable components; and
a processor that executes computer executable components stored in the memory, wherein the computer executable components comprise:
an information management component that determines a context item of information in an image based at least in part on analyzing the image and a group of context items of information, determines a first location of an item of text information within the image based at least in part on a second location determined for the context item of information;
an artificial intelligence component that employs a trained neural network that extracts, from the image, respective image portions that comprise respective bounding boxes comprising respective candidate items of text information and a third bounding box determined to comprise the context item of information, wherein the respective candidate items of text information are determined to be potential candidates for being the item of text information associated with the context item of information,
wherein the respective image portions comprise a first image portion comprising a first bounding box comprising a first candidate item of text information and the third bounding box comprising the context item of information, and representing a first relationship between the first candidate item of text information and the context item of information, and a second image portion comprising a second bounding box comprising a second candidate item of text information and the third bounding box comprising the context item of information, and representing a second relationship between the second candidate item of text information and the context item of information, wherein the trained neural network predicts that the first candidate item of text information is the item of text information that is associated with the context item of information based at least in part on a neural network analysis of the respective image portions that comprise the respective bounding boxes comprising the respective candidate items of text information and the third bounding box determined to comprise the context item of information, wherein the information management component determines that the item of text information is a target item of text information and alphanumeric characters of the item of text information based at least in part on the prediction and the context item of information and features of the item of text information extracted from the first bounding box associated with the item of text information and based at least in part on the alphanumeric characters of the item of text information being determined to correspond to a target item format associated with the context item of information, wherein the target item format specifies whether the alphanumeric characters are to comprise alphabetical characters and whether the alphanumeric characters are to comprise numerical characters, wherein the group of context items of information comprises the context item of information, and wherein the item of text information is determined to be associated with the context item of information based at least in part on a relative locational relationship between the first location and the second location; and an interface component that presents at least one of the context item of information or the item of text information.

16. The system of claim 15, wherein the interface component presents at least one of the context item of information or the item of text information in an editable format, and wherein the item of text information comprises the alphabetical characters or the numerical characters.

17. The system of claim 15, wherein the computer executable components comprise an orientation component that determines whether an orientation of the image is at an angle other than zero degrees based at least in part on an orientation analysis of a text orientation of at least one of the context item of information or the item of text information relative to an orientation line associated with the zero degrees, and wherein, in response to determining that the orientation of the image is at the angle other than the zero degrees based at least in part on the orientation analysis, the orientation component modifies the orientation of the image to re-orient the text orientation of at least one of the context item of information or the item of text information to align or substantially align at least one of the context item of information or the item of text information with the orientation line associated with the zero degrees.

18. The system of claim 15, wherein the trained neural network of the artificial intelligence component is trained based at least in part on a group of training example images comprising training data relating to items of text information and the group of context items, and wherein the trained neural network predicts that the item of text information is the target item of text information and predicts the alphanumeric characters of the item of text information based at least in part on results of performing an artificial intelligence-based analysis on the image or information relating to the image.

19. A non-transitory machine-readable medium, comprising executable instructions that, when executed by a processor, facilitate performance of operations, comprising:

determining a context item in a visual image based at least in part on analyzing the visual image and a set of context items, wherein the set of context items comprises the context item;

determining a first location of an item of text information within the visual image based at least in part on a second location determined for the context item, wherein the item of text information is determined to be associated with the context item based at least in part on a proximity of the first location to the second location;

extracting, from the visual image, respective visual sub-images that comprise respective bounding boxes containing respective candidate items of text information and a third bounding box determined to comprise the context item, wherein the respective candidate items of text information are determined to be potential candidates for being the item of text information associated with the context item, wherein the respective visual sub-images comprise a first visual sub-image comprising a first bounding box containing a first candidate item of text information and the third bounding box containing the context item, and depicting a first relationship between the first candidate item of text information and the context item, and a second visual sub-image comprising a second bounding box containing a second candidate item of text information and the third bounding box containing the context item, and depicting a second relationship between the second candidate item of text information and the context item;

predicting, by a trained neural network, that the first candidate item of text information is the item of text information that is associated with the context item based at least in part on a neural network analysis of the respective visual sub-images that comprise the respective bounding boxes containing the respective candidate items of text information and the third bounding box determined to comprise the context item; and determining that the item of text information is a target item of text information and alphanumeric characters of the item of text information based at least in part on the predicting and the context item and features of the item of text information extracted from the first bounding box associated with the item of text information and based at least in part on the alphanumeric characters of the item of text information being determined to satisfy a target item format associated with the context item, wherein the target item format indicates whether the alphanumeric characters are to comprise alphabetical characters and whether the alphanumeric characters are to comprise numerical characters.

20. The non-transitory machine-readable medium of claim 19, wherein the operations further comprise:

presenting at least one of the context item or the item of text information in an editable format, wherein the item of text information comprises the alphabetical characters or the numerical characters.

* * * * *